(12) United States Patent
Tatsuda

(10) Patent No.: US 10,616,446 B2
(45) Date of Patent: Apr. 7, 2020

(54) PRINTING APPARATUS

(71) Applicant: Seiko Epson Corporation, Tokyo (JP)

(72) Inventor: Tetsuo Tatsuda, Ina (JP)

(73) Assignee: Seiko Epson Corporation (JP)

(*) Notice: Subject to any disclaimer, the term of this patent is extended or adjusted under 35 U.S.C. 154(b) by 0 days.

(21) Appl. No.: 16/202,515

(22) Filed: Nov. 28, 2018

(65) Prior Publication Data

US 2019/0160839 A1    May 30, 2019

(30) Foreign Application Priority Data

Nov. 29, 2017    (JP) ................................ 2017-228722

(51) Int. Cl.
| | |
|---|---|
| *H04N 1/60* | (2006.01) |
| *B41J 29/393* | (2006.01) |
| *G02B 7/00* | (2006.01) |
| *G01C 25/00* | (2006.01) |
| *B41J 25/34* | (2006.01) |
| *G06K 15/02* | (2006.01) |

(52) U.S. Cl.
CPC ............ *H04N 1/6044* (2013.01); *B41J 25/34* (2013.01); *B41J 29/393* (2013.01); *G01C 25/005* (2013.01); *G02B 7/00* (2013.01); *G06K 15/027* (2013.01)

(58) Field of Classification Search
CPC .... B41J 29/393; H04N 1/6044; G06K 15/027
See application file for complete search history.

(56) References Cited

U.S. PATENT DOCUMENTS

| | | |
|---|---|---|
| 2005/0024410 A1 | 2/2005 | Subirada et al. |
| 2016/0171348 A1* | 6/2016 | Satoh ................. H04N 1/00251 347/110 |

FOREIGN PATENT DOCUMENTS

JP            2005-053228 A       3/2005

* cited by examiner

*Primary Examiner* — Julian D Huffman
(74) *Attorney, Agent, or Firm* — Harness, Dickey & Pierce, P.L.C.

(57) ABSTRACT

A printing apparatus includes a spectrometer that emits light to detect reflected light and outputs a signal corresponding to an intensity of the light, a white board that reflects the light, a carriage that holds the spectrometer, and a second adjustment mechanism that adjusts a posture of the spectrometer with respect to the carriage.

8 Claims, 21 Drawing Sheets

PRINTING APPARATUS

BACKGROUND

1. Technical Field

The present invention relates to a printing apparatus.

2. Related Art

In the related art, a printing apparatus that performs printing on a recording medium by discharging ink from nozzles installed in a print head has been widely used. The printing apparatus is also called an ink jet printer. In the printing apparatus, the print head is exchanged when a malfunction occurs in the print head. The type of paper and clothes as a recording medium to be printed can also be exchanged. When exchanging the print head or the recording medium, the printing status such as ink color, density, or printing spots on the printed medium is checked.

A light sensor is used to check the printing status. The light sensor is a unit that irradiates light to the medium to detect the color and brightness of the reflected light. For the light sensor, a sensor combining a spectrometer and a photosensor or the like is used. The light sensor converts intensity of the light at a specific wavelength into an electric signal and outputs the signal. A printing apparatus mounted with the light sensor is disclosed in JP-A-2005-53228. According to JP-A-2005-53228, the printing apparatus includes a carriage for moving the print head. The light sensor is mounted on the carriage.

The printing apparatus includes a calibration mark for calibrating the output of the light sensor. The carriage moves the light sensor to a position facing the calibration mark. The light sensor detects the light reflected on the calibration mark and outputs the electric signal.

When the spectrometer is used in the light sensor, there is a need to adjust a posture of the spectrometer installed in the carriage. When the posture of the spectrometer is not appropriate, the spectrometer cannot correctly perform the measurement of wavelength of light or the intensity of light. In the printing apparatus of JP-A-2005-53228, the calibration of the light sensor is performed on a premise that the light sensor is correctly installed, but a mechanism for adjusting the posture of the light sensor is not installed. A printing apparatus capable of adjusting the posture of the spectrometer with respect to the carriage to an appropriate posture has been desired.

SUMMARY

An advantage of some aspects of the invention is to solve the problems described above, and the invention can be implemented as the following forms or application examples.

APPLICATION EXAMPLE 1

A printing apparatus according to this application example includes: a spectrometer that emits light to detect reflected light and outputs a signal corresponding to an intensity of the light; a white board that reflects the light; a carriage that holds the spectrometer; and an adjustment mechanism that adjusts a posture of the spectrometer with respect to the carriage.

According to this application example, the printing apparatus includes the spectrometer, the carriage, and the adjustment mechanism. The spectrometer emits light to detect reflected light. The carriage holds the spectrometer. The adjustment mechanism adjusts the posture of the spectrometer with respect to the carriage. The white board reflects the light.

The spectrometer emits light to the white board, and the white board reflects the light. The spectrometer detects the reflected light. The spectrometer outputs a signal corresponding to the intensity of the detected light. The sensitivity of the spectrometer when the posture of the spectrometer with respect to the carriage is appropriate is better than the sensitivity of the spectrometer when the posture of the spectrometer is not appropriate.

The adjustment mechanism is operated so that the sensitivity of the spectrometer is improved. The posture of the spectrometer with respect to the carriage can be adjusted to an appropriate posture by operating the adjustment mechanism.

APPLICATION EXAMPLE 2

In the printing apparatus according to the application example, the adjustment mechanism includes three or more linear motion mechanisms, and the linear motion mechanism adjusts the posture of the spectrometer and the carriage.

According to this application example, the adjustment mechanism includes three or more linear motion mechanisms. When each linear motion mechanism moves by the same length, the distance of the spectrometer with respect to the carriage can be adjusted. When one of the three or more linear motion mechanisms moves, the inclination of the spectrometer with respect to the carriage can be adjusted. That is, the spectrometer can be rotated around one direction as an axis.

By changing the linear motion mechanism to be moved, it is possible to change a direction in which the spectrometer is inclined with respect to the carriage. That is, the spectrometer can be rotated around another direction as an axis. Accordingly, the adjustment mechanism can adjust the position and inclination of the spectrometer with respect to the carriage.

APPLICATION EXAMPLE 3

In the printing apparatus according to the application example, the printing apparatus further includes a print head that is installed in the carriage and prints an image; a carriage moving portion that moves the carriage; a movement amount measurement unit that measures a movement amount of the carriage; and a printing medium moving portion that moves a printing medium in a direction intersecting a moving direction of the carriage, and the carriage moving portion and the printing medium moving portion move the spectrometer to a position facing the image.

According to this application example, the print head is installed in the carriage. The carriage moving portion moves the carriage, and the printing medium moving portion moves the printing medium to the direction intersecting the moving direction of the carriage. The print head prints an image. The carriage moving portion and the printing medium moving portion move the spectrometer to the position facing the image. The spectrometer receives the light reflected on the image and outputs the signal of the intensity of the light corresponding to the image. Accordingly, when the printing medium moving portion and the carriage moving portion move the spectrometer, it is possible to detect whether or not the spectrometer is located at a position facing the image. The movement amount measurement unit measures the movement amount of the carriage. Accordingly, it is possible to detect the relative position of the position where the print head prints the image and the position where the spectrometer detects the light.

APPLICATION EXAMPLE 4

In the printing apparatus according to the application example, the printing apparatus further includes a control unit that controls a movement of the carriage, and the control unit has a storage unit, and the storage unit may store a relative position of a position where the print head prints the image and a position where the spectrometer detects light, and a position of the image.

According to this application example, the control unit controls the movement of the carriage. The control unit has the storage unit, and the storage unit stores the position where the print head printed the image. The storage unit stores the relative position of the position where the print head prints the image and the position where the spectrometer detects the light. Accordingly, the control unit can move the spectrometer to the position facing the image.

APPLICATION EXAMPLE 5

In the printing apparatus according to the application example, the printing apparatus further includes a body portion that supports a rail on which the carriage moves, and in the body portion, the white board is installed at a position facing a range where the spectrometer moves.

According to this application example, the printing apparatus includes the body portion. The body portion supports the rail on which the carriage moves. The white board is installed in the body portion. The white board is installed at the position facing the range where the spectrometer moves. At this time, it is possible to easily move the spectrometer to the position facing the white board.

APPLICATION EXAMPLE 6

In the printing apparatus according to the application example, the printing apparatus further includes a cover that covers the white board so as to be openable and closable.

According to this application example, the printing apparatus includes the cover that covers the white board so as to be openable and closable. When using the white board, it is possible to expose the white board by opening the cover. It is possible to move the spectrometer to the position facing the white board. The cover is closed when the white board is not used. At this time, since the white board is covered with the cover, contamination of the white board can be suppressed even when mist of the ink is generated during the printing.

APPLICATION EXAMPLE 7

In the printing apparatus according to the application example, the adjustment mechanism includes an operation unit that operates the adjustment mechanism on a side opposite to a side where the print head discharges ink.

According to this application example, the adjustment mechanism includes the operation unit that operates the adjustment mechanism. It is possible to adjust the posture of the carriage and the spectrometer by operating the operation unit. The operation unit is installed on the side opposite to the side where the print head discharges the ink. There is the mechanism that controls the posture of the printing medium to be printed on the side where the print head discharges the ink. Since there is a space on the side opposite to the side where the print head discharges the ink, it is possible to easily operate the operation unit.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments will be described with reference to the drawings. In order to make each member in each drawing to be recognizable to the size of each drawing, the scale is shown differently for each member.

Embodiment

Figure 1:
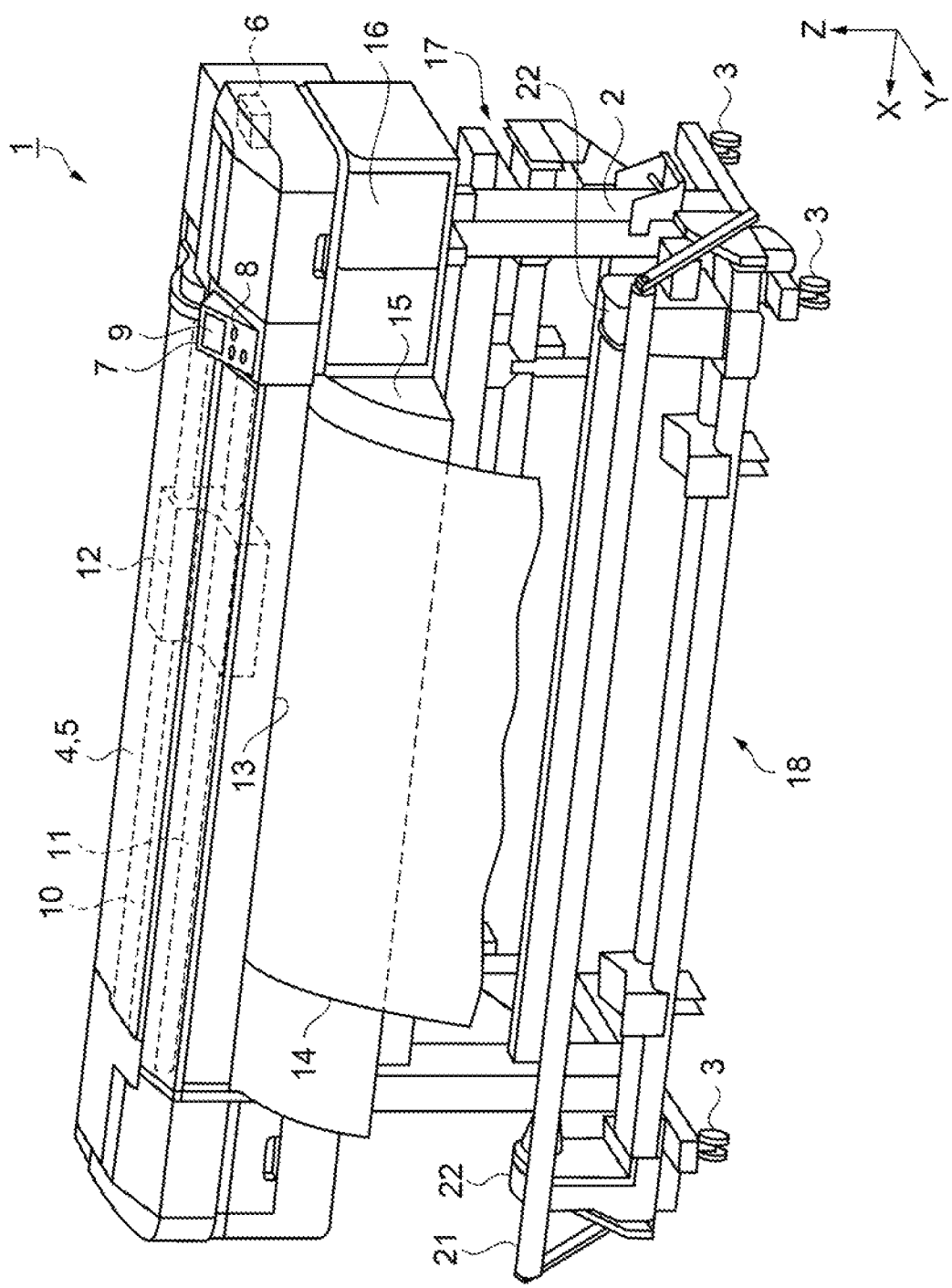
FIG. 1 is a schematic perspective view illustrating a structure of a printing apparatus.

In the present embodiment, a characteristic example of a printing apparatus will be described with reference to the drawings. The printing apparatus according to the embodiment will be described with reference to FIGS. 1 to 19. FIG. 1 is a schematic perspective view illustrating a structure of a printing apparatus. As illustrated in FIG. 1, a printing apparatus 1 is a roll-to-roll type large format ink jet printer that handles a relatively large type printing medium. The printing apparatus 1 has a shape elongated in one direction along the ground. A longitudinal direction of the printing apparatus 1 is defined as an X direction, and the left side of the FIG. 1 is defined as a +X direction. A direction orthogonal to the X direction along the ground is defined as a Y direction. A gravitational acceleration direction is defined as a −Z direction.

The printing apparatus 1 includes a leg portion 2 as a body portion. Wheels 3 are installed on a −Z direction side of the leg portion 2, and the printing apparatus 1 is movable. A lock function (not illustrated) is installed on the wheels 3, so that the wheels 3 do not rotate when the printing apparatus 1 is used. A housing portion 4 is installed on a +Z direction side of the leg portion 2, and a printing unit 5 and a control unit 6 that controls the printing apparatus 1 are installed inside the housing portion 4.

An operation panel 7 is installed on the +Z direction side and an −X direction side of the housing portion 4. The operation panel 7 includes an operation unit 8 and a display unit 9. The operation unit 8 is constituted with a push switch and the like. An operator operates the operation unit 8 when inputting print conditions and the like and giving various instructions. The display unit 9 is constituted with a liquid crystal display device and the like. On the display unit 9, a screen for setting print conditions is displayed.

In the printing unit 5, a guide rail 10 as a rail, a guide rail 11 as a rail, and a carriage 12 are installed. A head unit (not illustrated) that discharges ink in ink droplets is installed in the carriage 12. The guide rail 10 and the guide rail 11 extend in the X direction, and the carriage 12 moves along the guide rail 10 and the guide rail 11. The leg portion 2 supports the guide rail 10 and the guide rail 11 on which the carriage 12 moves.

A discharge port 13 is installed on a +Y direction side of the housing portion 4, and a printing medium 14 discharged by the printing unit 5 is discharged from the discharge port 13. A downstream side support portion 15 is installed on the −Z direction side of the discharge port 13. The downstream side support portion 15 guides the printing medium 14 discharged from the discharge port 13. An ink mounting portion 16 is installed on the −X direction side of the downstream side support portion 15. Ink is stored in the ink mounting portion 16.

A medium supply portion 17 is installed on a −Y direction side of the leg portion 2. The medium supply portion 17 supplies the printing medium 14 to the printing unit 5. A medium winding portion 18 is installed on the +Y direction side of the leg portion 2. The medium winding portion 18 winds up the printing medium 14 discharged from the discharge port 13. The medium winding portion 18 includes a tension roller 21 and a second holder 22. The tension roller 21 includes a rod-like member extending in the X direction, and applies constant tension to the printing medium 14. Accordingly, the tension roller 21 suppresses generation of wrinkles on the printing medium 14. The second holder 22 winds and holds the printing medium 14 in a cylindrical shape.

Figure 2:
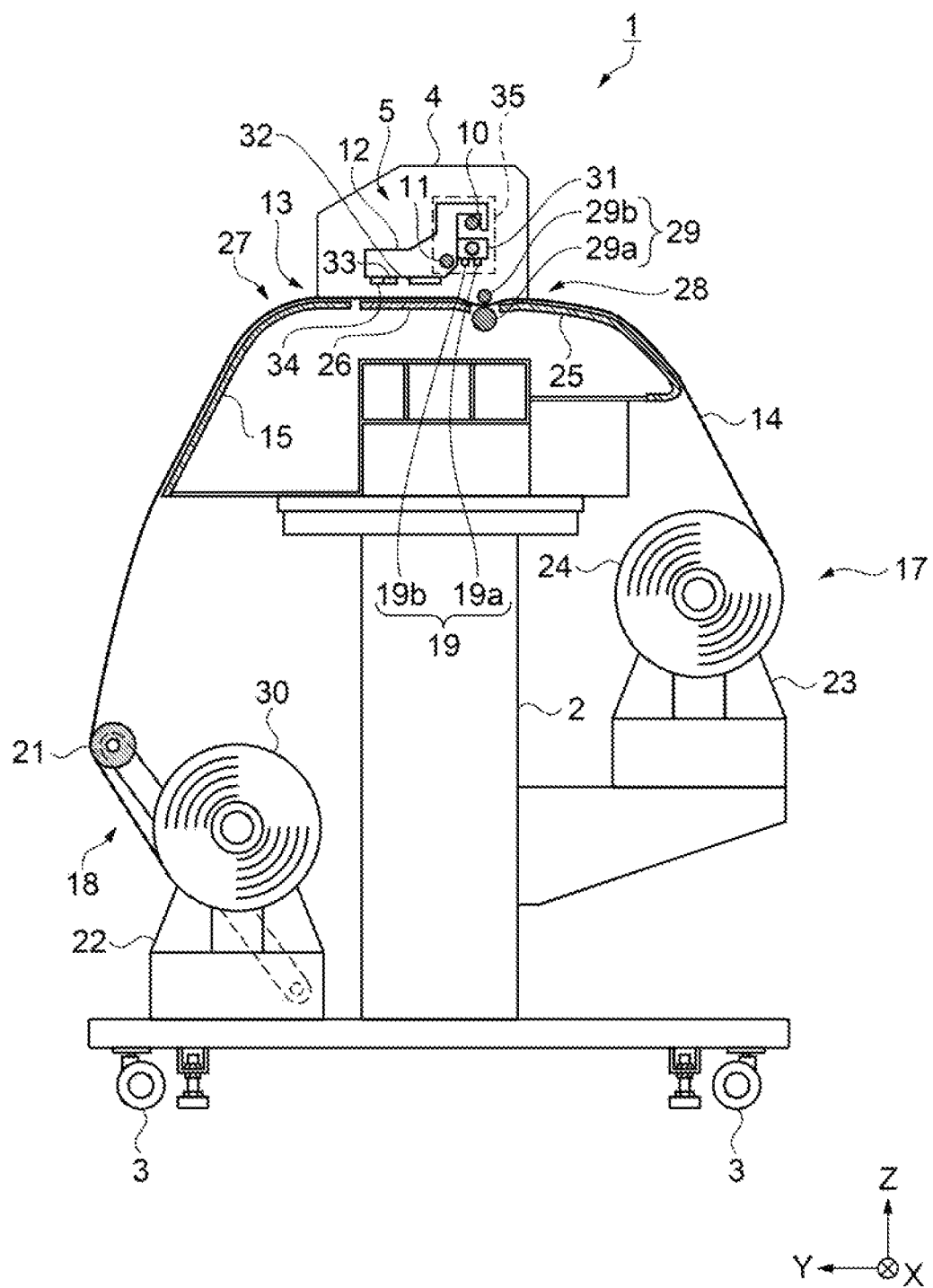
FIG. 2 is a schematic side sectional view illustrating the structure of the printing apparatus.

FIG. 2 is a schematic side sectional view illustrating the structure of the printing apparatus. As illustrated in FIG. 2, the medium supply portion 17 includes a first holder 23. The first holder 23 holds a first roll body 24 in which the unused printing medium 14 is wound up in a cylindrical shape. The medium supply portion 17 includes a motor (not illustrated). The medium supply portion 17 rotates the first roll body 24 in a counterclockwise direction with the X direction as an axis. Accordingly, the printing medium 14 is supplied from the first roll body 24 to the printing unit 5. The types of the printing medium 14 are broadly categorized into a paper type and a film type. Specific examples include high-quality paper, cast paper, art paper, coated paper, and the like in the paper type, and synthetic paper, polyethylene terephthalate (PET), polypropylene (PP), and the like in the film type.

An upstream side support portion 25, a platen 26, and the downstream side support portion 15 are installed in this order between the housing portion 4 and the leg portion 2 from the −Y direction side to the +Y direction side. The upstream side support portion 25, the platen 26, and the downstream side support portion 15 guide the printing medium 14. The upstream side support portion 25, the platen 26, and the downstream side support portion 15 constitute a transport path 27 of the printing medium 14.

A supply port 28 is installed between the upstream side support portion 25 and the housing portion 4. The printing medium 14 supplied from the medium supply portion 17 is guided to the supply port 28 via the upstream side support portion 25. A transport roller 29 as a printing medium moving portion is installed between the upstream side support portion 25 and the platen 26. The transport roller 29 includes a transport driving roller 29a and a transport driven roller 29b. The transport driving roller 29a and the transport driven roller 29b have a shape elongated in the X direction intersecting the +Y direction side which is a moving direction of the printing medium 14. The transport driving roller 29a is disposed on the −Z direction side of the transport path 27. The transport driven roller 29b is disposed on the +Z direction side of the transport driving roller 29a. The transport driven roller 29b rotates following the rotation of the transport driving roller 29a. The transport driven roller 29b is provided with an encoder that measures a rotation angle. The transport driven roller 29b measures the movement amount of the printing medium 14.

The transport roller 29 is provided with a spring (not illustrated). The spring presses the transport driven roller 29b against the transport driving roller 29a. In a state in which the transport driven roller 29b is pressed against the transport driving roller 29a, the transport roller 29 sends out to the printing unit 5 in a +Y direction while pinching the printing medium 14. A transport motor (not illustrated) that is rotated by the transport driving roller 29a is installed inside the housing portion 4. As the transport motor rotates and drives the transport driving roller 29a, the printing medium 14 pinched between the transport driven roller 29b and the transport driving roller 29a is transported in the +Y direction. In this way, the transport roller 29 moves the printing medium 14 in a direction orthogonal to a moving direction of the carriage 12. The moving direction of the printing medium 14 and the moving direction of the carriage 12 are not limited to be orthogonal to each other, but may be intersecting with each other.

The printing medium 14 passed through the transport roller 29 moves along the platen 26. The printing medium 14 passed through the platen 26 moves along the downstream side support portion 15. The discharge port 13 is installed between the downstream side support portion 15 and the housing portion 4. The printing medium 14 is discharged from the discharge port 13 to the outside of the housing portion 4. The printing medium 14 passed through the discharge port 13 moves along the downstream side support portion 15, and moves toward the medium winding portion 18.

In the medium winding portion 18, the printing medium 14 printed by the printing unit 5 is wound around in a cylindrical shape to form a second roll body 30. The second holder 22 holds a core (not illustrated), and the printing medium 14 is wound around the core to form the second roll body 30. A winding motor (not illustrated) that supplies turning power to the core is provided on one side of the second holder 22. The winding motor is driven and the core rotates. Accordingly, the printing medium 14 is wound around the core. The tension roller 21 hangs down by the gravity, and presses the back side of the printing medium 14. In this way, the tension roller 21 applies tension to the printing medium 14.

A carriage moving portion 31 is installed inside the housing portion 4. The carriage moving portion 31 reciprocates the carriage 12 in an X direction. The X direction in which the carriage 12 moves is called a main scanning direction. The carriage 12 is supported by the guide rail 10 and the guide rail 11 disposed along the X direction. The carriage 12 is configured to be reciprocatable in the ±X direction by the carriage moving portion 31. As a mechanism of the carriage moving portion 31, for example, a mechanism combining a ball screw and a ball nut, a linear guide mechanism, or the like may be applied. Further, a motor (not illustrated) as a power source for moving the carriage 12 along the X direction is provided in the carriage moving portion 31. When the motor is driven under the control of the control unit 6, the carriage 12 reciprocates in the X direction. In this way, the control unit 6 controls the movement of the carriage 12.

A movement amount measurement unit 19 that measures the movement amount of the carriage 12 is installed near the guide rail 11 and the carriage moving portion 31. The movement amount measurement unit 19 is provided with a scale 19a and a graduation reading unit 19b. Graduations of equal interval are installed on the scale 19a, and the graduation reading unit 19b detects the graduation installed on the scale 19a. The scale 19a is installed on a member that fixes the guide rail 10 and the guide rail 11. The graduation reading unit 19b is installed in the carriage 12. When the carriage 12 moves, the graduation reading unit 19b moves with the carriage 12. The graduation reading unit 19b measures the movement amount of the carriage 12 by detecting the graduation on the scale 19a and outputs the result to the control unit 6. Accordingly, the control unit 6 can recognize the position of the carriage 12 in the X direction. Devices of various types, such as optical type and magnetic type can be used as the movement amount measurement unit 19. In the present embodiment, for example, a magnetic type device is used. Since the magnetic type is unlikely to be affected by contamination on the scale 19a, the movement amount measurement unit 19 can reliably measure the position of the carriage 12.

A head unit 32 as a print head, a reflective sensor 33, and a spectrometer 34 are installed in the carriage 12. Accordingly, the carriage 12 holds the spectrometer 34. The head unit 32 discharges ink droplets to the printing medium 14 transported along the platen 26. The head unit 32 prints an image using the ink droplets. The reflective sensor 33 is an optical sensor provided with a light source unit and a light receiving unit (not illustrated). The reflective sensor 33 receives reflected light of light emitted in the −Z direction from the light source unit by the light receiving unit, and outputs a detection value corresponding to an intensity of the reflected light received by the light receiving unit to the control unit 6. The reflective sensor 33 detects presence or absence of the printing medium 14. The reflective sensor 33 performs detection of the printing medium 14 while moving the carriage 12 in the X direction. The control unit 6 detects positions of both ends of the printing medium 14 in the X direction based on the direction value. The control unit 6 calculates a length of the printing medium 14 in the X direction. The length of the printing medium 14 in the X direction corresponds to a width of the printing medium 14. In accordance with the detected width of the printing medium 14, the head unit 32 discharges ink droplets on the printing medium 14 to perform printing.

The spectrometer 34 is an optical sensor provided with the light source unit, a filter portion, and the light receiving unit (not illustrated). The reflected light of the light emitted from the light source unit in the −Z direction passes the filter portion and is received by the light receiving unit. The detection value corresponding to the intensity of the reflected light received by the light receiving unit is output to the control unit 6. The filter portion is provided with a wavelength variable Fabry-Perot etalon, and the control unit 6 can allow the filter portion to pass only the light having a specific wavelength limitedly. The control unit 6 controls the wavelength of the light that passes through the filter portion. In this way, the spectrometer 34 emits light to detect reflected light and outputs a signal corresponding to the intensity of the light.

In addition, a first adjustment mechanism 35 is installed inside the housing portion 4. The first adjustment mechanism 35 is disposed at both ends of the guide rail 10 and the guide rail 11 in the X direction. The first adjustment mechanism 35 is a mechanism for adjusting a distance between the head unit 32 and the printing medium 14. The first adjustment mechanism 35 changes the position of the head unit 32 in a Z direction.

Figure 3:
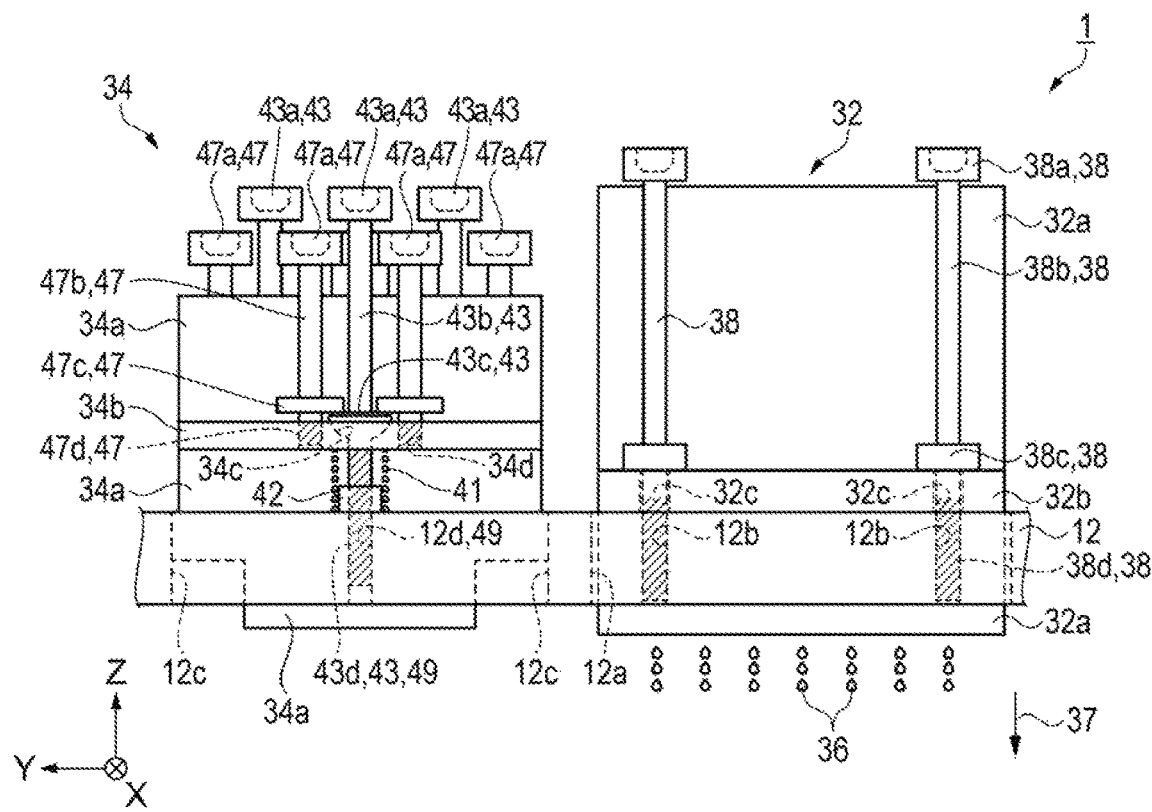
FIG. 3 is a schematic side view illustrating a structure of a carriage.

FIG. 3 is a schematic side view illustrating a structure of a carriage, which is a view seen from the −X direction side. As illustrated in FIG. 3, the head unit 32 and the spectrometer 34 are installed in the carriage 12. A plurality of the head units 32 are installed in the carriage 12, and one spectrometer 34 is installed in the carriage 12. The head unit 32 discharges ink 36 in the −Z direction. The −Z direction in which the ink 36 is discharged is referred to as a discharge direction 37.

The head unit 32 includes a body portion 32a and a flange 32b that projects from the body portion 32a in two directions of the +X direction and the −X direction. A head hole 12a is installed on the carriage 12, and a portion of the body portion 32a is inserted into the head hole 12a.

The flange 32b is in contact with the carriage 12. Two through-holes 32c are installed on one flange 32b. A screw hole 12b is installed at a position facing the through-hole 32c in the carriage 12. A head fixing screw 38 is inserted into the through-hole 32c and the screw hole 12b. The head unit 32 is fixed to the carriage 12 by the head fixing screw 38.

The head fixing screw 38 has a configuration in which a head portion 38a, a cylindrical portion 38b, a pedestal portion 38c, and a screw portion 38d are installed in this order from the +Z direction side to the −Z direction side. A hexagonal hole is installed on a surface of the head portion 38a on the +Z direction side, and it is possible to rotate the head fixing screw 38 by inserting a hexagonal wrench into the hole. The pedestal portion 38c has a disc shape. A diameter of the pedestal portion 38c is larger than a diameter of the through-hole 32c, and a diameter of the screw portion 38d is smaller than the diameter of the through-hole 32c. The screw portion 38d is inserted into the through-hole 32c of the flange 32b and screwed with the screw hole 12b. The head unit 32 is fixed to the carriage 12 by tightening the pedestal portion 38c and the carriage 12 with the flange 32b interposed in between. Since the head portion 38a is installed on a side opposite to the discharge direction 37, it is possible to rotate the head portion 38a to attach and detach the head unit 32.

Figure 4:
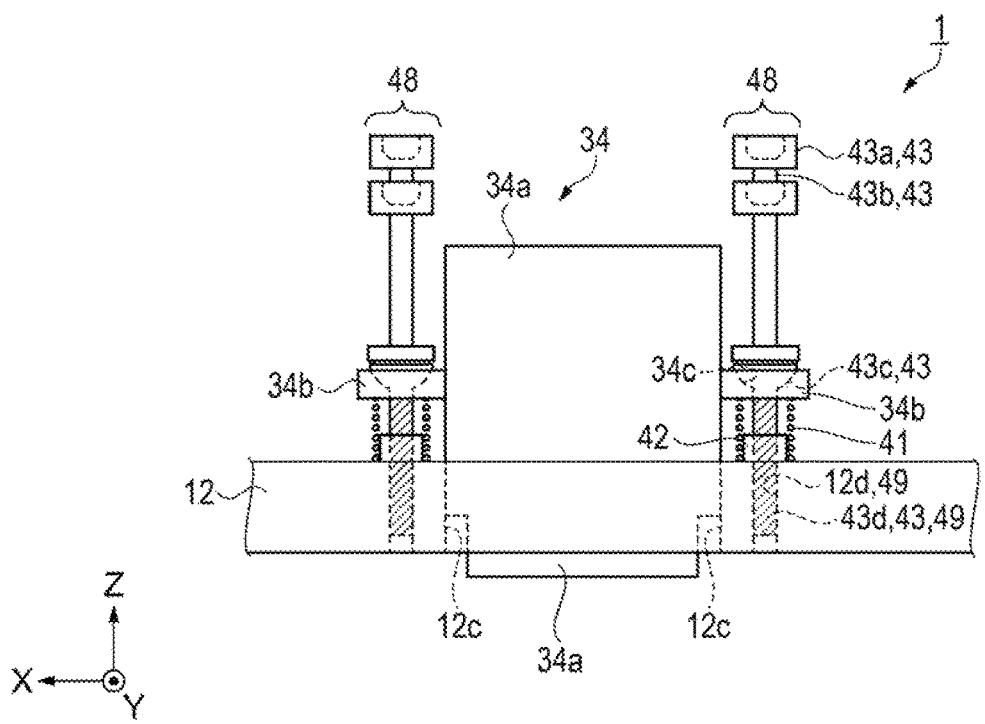
FIG. 4 is a schematic side view illustrating a fixing structure of a spectrometer to the carriage.
Figure 5:
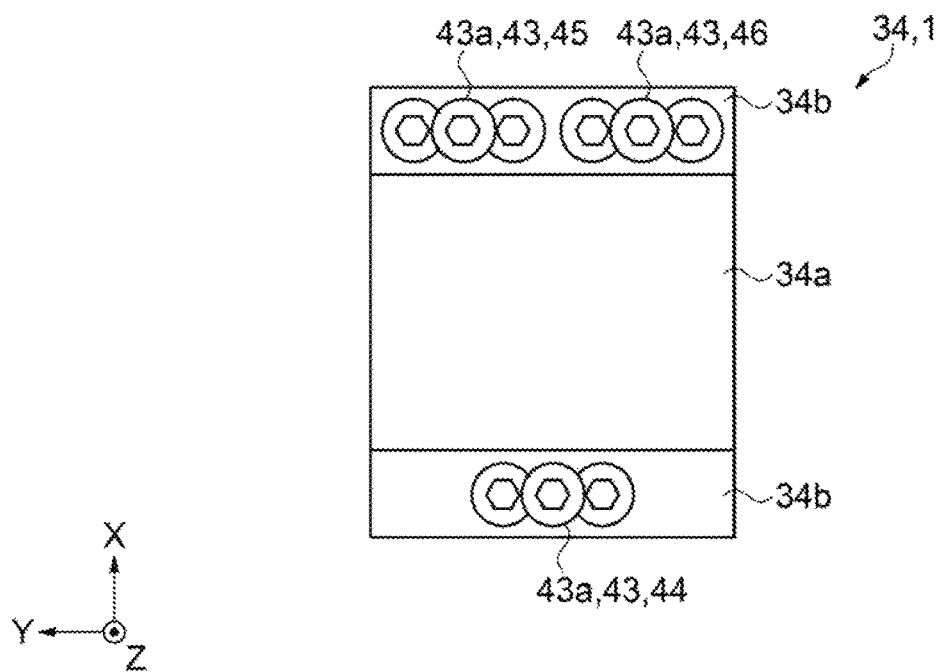
FIG. 5 is a schematic plan view illustrating the fixing structure of the spectrometer to the carriage.

FIG. 4 is a schematic side view illustrating a fixing structure of a spectrometer to the carriage, which is seen from the Y direction. FIG. 5 is a schematic plan view illustrating the fixing structure of the spectrometer to the carriage, which is seen from the Z direction. As illustrated in FIGS. 3 to 5, the spectrometer 34 includes a body portion 34a and a flange 34b that projects from the body portion 34a in two directions of +X direction and the −X direction. A spectrometer hole 12c is installed on the carriage 12, and a portion of the body portion 34a is inserted into the spectrometer hole 12c.

A coil spring 41 is installed between the flange 34b and the carriage 12. Two through-holes 34c are installed on the flange 34b on a +X direction side. One through-hole 34c is installed on the flange 34b on the −X direction side. A screw hole 12d is installed at a position facing the through-hole 34c in the carriage 12. A projection 42 is provided at a position of the screw hole 12d, and the coil spring 41 is inserted into the projection 42. A spectrometer fixing screw 43 is inserted into the through-hole 34c and the screw hole 12d. The spectrometer 34 is fixed to the carriage 12 by three spectrometer fixing screws 43 and three coil springs 41.

The spectrometer fixing screw 43 has a configuration in which a head portion 43a as an operation unit, a cylindrical portion 43b, a pedestal portion 43c, and a screw portion 43d are disposed in this order from the +Z direction side to the −Z direction side. A hexagonal hole is installed on a surface of the head portion 43a on the +Z direction side, and it is possible to rotate the spectrometer fixing screw 43 by inserting a hexagonal wrench into the hole. A diameter of a thick portion of the pedestal portion 43c is larger than a diameter of a thin portion of the through-hole 34c, and a diameter of the screw portion 43d is smaller than the diameter of the thin portion of the through-hole 34c. The screw portion 43d is inserted into the through-hole 34c of the flange 34b and screwed with the screw hole 12d. The spectrometer 34 is fixed to the carriage 12 by interposing the flange 34b among the pedestal portion 43c, the coil spring 41, and the carriage 12. Since the head portion 43a is installed on a side opposite to the discharge direction 37, it is possible to operate the head portion 43a to adjust a posture of the spectrometer 34. The spectrometer fixing screw 43 includes the head portion 43a on a side opposite to a side on which the head unit 32 discharges the ink 36.

As illustrated in FIG. 5, the spectrometer fixing screw 43 installed on the flange 34b on the −X direction side is defined as a first fixing screw 44. Two spectrometer fixing screws 43 are installed on the flange 34b on the +X direction side. Between the two spectrometer fixing screws 43, the spectrometer fixing screw 43 on the +Y direction side is defined as a second fixing screw 45, and the spectrometer fixing screw 43 on the −Y direction side is defined as a third fixing screw 46. The posture of the spectrometer 34 with respect to the carriage 12 can be adjusted by adjusting the first fixing screw 44, the second fixing screw 45, and the third fixing screw 46.

As illustrated in FIG. 3, screw holes 34d are installed on both sides of each of the three through-holes 34c on the flange 34b in the Y direction. A locking screw 47 is installed in the screw hole 34d. The locking screw 47 has a configuration in which a head portion 47a, a cylindrical portion 47b, a pedestal portion 47c, and a screw portion 47d are installed in this order from the +Z direction side to the −Z direction side. A hexagonal hole is installed on a surface of the head portion 47a on the +Z direction side, and it is possible to rotate the locking screw 47 by inserting a hexagonal wrench into the hole. The pedestal portion 47c has a disc shape. The screw portion 47d is screwed into the screw hole 34d of the flange 34b. When seen from the Z direction, the pedestal portion 47c overlaps the pedestal portion 43c of the spectrometer fixing screw 43. The operator rotates the locking screw 47 to press the pedestal portion 47c of the locking screw 47 against the pedestal portion 43c of the spectrometer fixing screw 43. At this time, friction between the pedestal portion 47c of the locking screw 47 and the pedestal portion 43c of the spectrometer fixing screw 43 is increased so that the rotation of the spectrometer fixing screw 43 can be suppressed.

The locking screw 47 is installed on both sides of the spectrometer fixing screw 43. The pedestal portion 47c of the locking screw 47 holds down the pedestal portion 43c of the spectrometer fixing screw 43 from both sides. Accordingly, the rotation of the spectrometer fixing screw 43 can be reliably suppressed even when the pedestal portion 43c of the spectrometer fixing screw 43 is inclined.

A second adjustment mechanism 48 as an adjustment mechanism is constituted with the carriage 12, the flange 34b, the spectrometer fixing screw 43, the coil spring 41, and the like. A second adjustment mechanism 48 adjusts the posture of the spectrometer 34 with respect to the carriage 12. A linear motion mechanism 49 in which the spectrometer fixing screw 43 is linearly moved is constituted with the screw hole 12d installed on the carriage 12 and the screw portion 43d of the spectrometer fixing screw 43. The second adjustment mechanism 48 includes three linear motion mechanisms 49, and the linear motion mechanism 49 adjusts the posture of the spectrometer 34 and the carriage 12. The number of linear motion mechanisms 49 installed in the second adjustment mechanism 48 may be three or more. The inclination of the spectrometer 34 can be adjusted when the number of the linear motion mechanisms 49 is three or more.

The second adjustment mechanism 48 includes the head portion 43a that operates the second adjustment mechanism 48 on the side opposite to the side on which the head unit 32 discharges the ink 36. It is possible to adjust the posture of the carriage 12 and the spectrometer 34 by rotating the head portion 43a. The head portion 43a is installed on the side opposite to the side on which the head unit 32 discharges the ink 36. There is the platen 26 that controls a posture of the printing medium 14 to be printed on the side on which the head unit 32 discharges the ink 36. Since there is a space on the side opposite to the side on which the head unit 32 discharges the ink 36, the head portion 43a can be easily operated.

Figure 6:
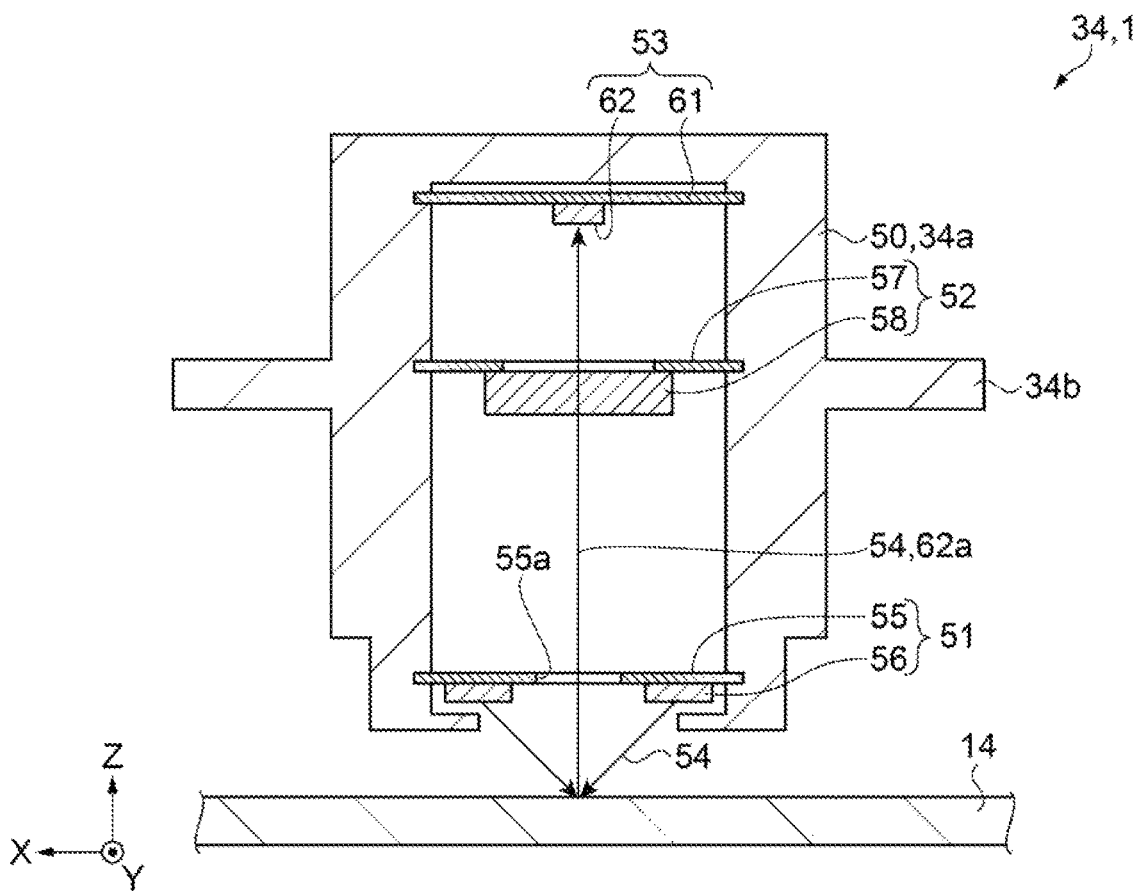
FIG. 6 is a schematic side sectional view illustrating a structure of the spectrometer.

FIG. 6 is a schematic side sectional view illustrating a structure of the spectrometer. As illustrated in FIG. 6, the spectrometer 34 includes a housing 50, and a light source unit 51, a filter unit 52, and a light receiving unit 53 are installed inside the housing 50. The light source unit 51, the filter unit 52, and the light receiving unit 53 are disposed in this order from the −Z direction side to the +Z direction side. The light source unit 51 emits light 54 toward the printing medium 14. A portion of the light 54 reflected on the printing medium 14 travels toward the light receiving unit 53. A portion of the light 54 traveling toward the light receiving unit 53 passes through the filter unit 52. The filter unit 52 allows the light 54 having a predetermined wavelength to pass. In the filter unit 52, it is possible to change the wavelength of the passing light 54. The light receiving unit 53 receives the light 54 passed through the filter unit 52. The light receiving unit 53 converts the intensity of the light 54 into an electric signal and outputs the signal to the control unit 6.

The light source unit 51 includes a first substrate 55, and a light emitting element 56 is installed on the first substrate 55. A hole 55a is installed on the first substrate 55, and the light emitting element 56 is disposed surrounding the hole 55a. A switch circuit and a first connector (not illustrated) are installed on the first substrate 55. The light emitting element 56 is electrically connected to the first connector by a wiring (not illustrated). The first connector is electrically connected to the control unit 6 by a wiring (not illustrated).

The control unit 6 outputs power and a control signal to the switch circuit. The control signal is a signal for instructing turning on and off of the light emitting element 56. When the control signal for instructing turning on of the light emitting element 56 is input, the switch circuit supplies the power to the light emitting element 56. When the control signal for instructing turning off of the light emitting element 56 is input, the switch circuit stops the supply of the power to the light emitting element 56. Accordingly, the light emitting element 56 turns on and off according to the control signal output from the control unit 6.

The filter unit 52 includes a second substrate 57, and a filter drive circuit and a second connector (not illustrated) are installed on the second substrate 57 in addition to a wavelength variable filter 58. The wavelength variable filter 58 is electrically connected to the filter drive circuit by a wiring (not illustrated). The filter drive circuit is electrically connected to the second connector by a wiring (not illustrated). The wavelength variable filter is a wavelength variable Fabry-Perot etalon. The wavelength variable Fabry-Perot etalon is a compact wavelength variable filter 58. Accordingly, the spectrometer 34 can be downsized. The filter drive circuit is a circuit that drives the wavelength variable filter 58. The filter drive circuit controls the wavelength of the light 54 passing through the wavelength variable filter 58.

The filter drive circuit is electrically connected to the second connector. The second connector is electrically connected to the control unit 6 by a wiring. The control unit 6 outputs a control signal to the filter drive circuit. The control signal is a signal indicating the wavelength of the light 54 passing through the wavelength variable filter 58. The filter drive circuit changes the wavelength to pass through the wavelength variable filter 58 according to the control signal.

The light receiving unit 53 includes a third substrate 61, and a light receiving element driving circuit and a third connector (not illustrated) are installed on the third substrate 61 in addition to a light receiving element 62. The light receiving element 62 is electrically connected to the light receiving element driving circuit. The light receiving element driving circuit is electrically connected to the third connector. The third connector is electrically connected to the control unit 6 by a wiring (not illustrated). The light receiving element 62 detects the intensity of incident light. The light receiving element 62 outputs a voltage signal corresponding to the intensity of the light 54. A silicon photodiode or a photo integrated circuit (IC) can be used for the light receiving element 62. The light receiving element driving circuit is a circuit for driving the light receiving element 62. The light receiving element driving circuit supplies power to the light receiving element 62, receives the voltage signal output from the light receiving element 62, and converts the voltage signal into a digital signal. The light receiving element driving circuit outputs a digital signal indicating the intensity of the light to the control unit 6. The control unit 6 receives the digital signal output from the light receiving element driving circuit in accordance with the timing when the adjustment of the wavelength of the light 54 passed through the wavelength variable filter 58 is completed. Accordingly, the control unit 6 can detect the intensity of the light 54 having a specific wavelength with good quality.

The light receiving element 62 has an optical axis 62a indicating a direction of high sensitivity in the light receiving sensitivity distribution. When an angle formed by a direction orthogonal to a surface of the printing medium 14 and the optical axis 62a changes, the intensity of the light 54 received by the light receiving element 62 changes. Since the carriage 12 is adjusted to move parallel with respect to the printing medium 14, there is a need to set the optical axis 62a in an appropriate direction with respect to the carriage 12. Accordingly, there is a need to install the spectrometer 34 in an appropriate posture with respect to the carriage 12.

Figure 7:
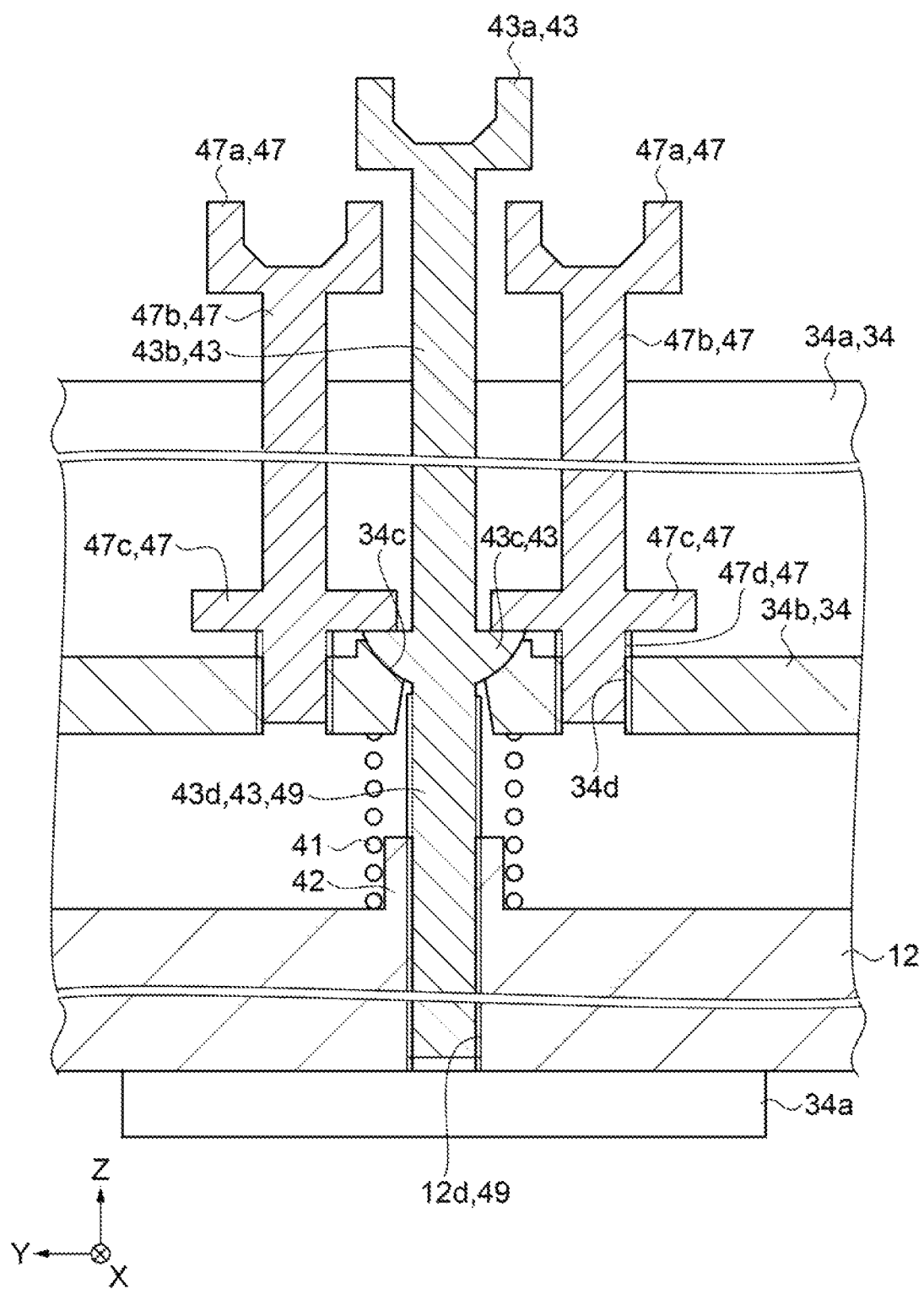
FIG. 7 is a main part schematic side sectional view illustrating a structure of a linear motion mechanism.
Figure 8:
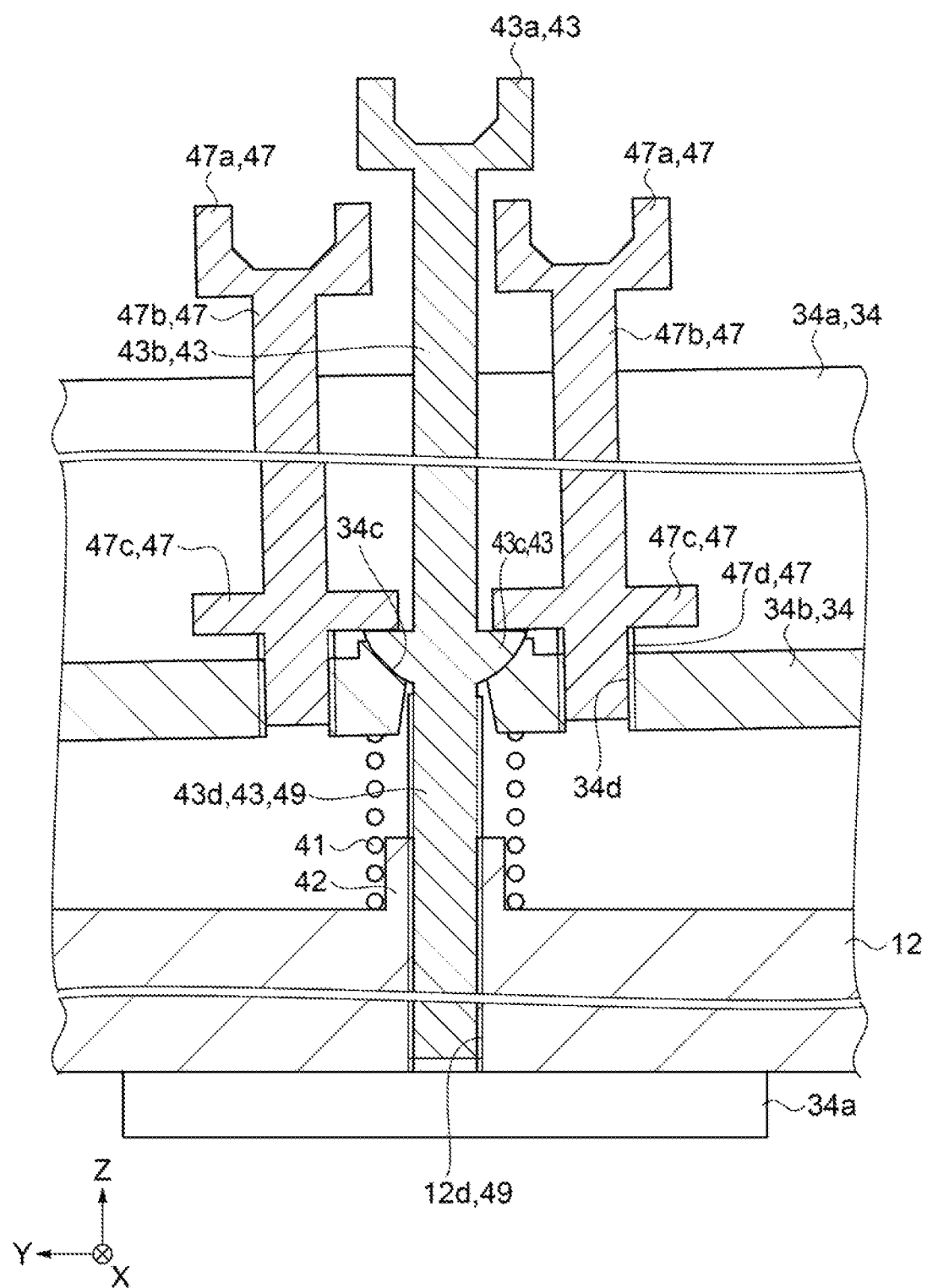
FIG. 8 is a main part schematic side sectional view illustrating the structure of the linear motion mechanism.

FIGS. 7 and 8 are main part schematic side sectional views illustrating the structure of a linear motion mechanism. As illustrated in FIG. 7, the coil spring 41 is installed between the carriage 12 and the flange 34b of the spectrometer 34, and the coil spring 41 urges the flange 34b in a direction away from the carriage 12. The pedestal portion 43c of the spectrometer fixing screw 43 abuts against the through-hole 34c of the spectrometer 34, and thereby a distance between the carriage 12 and the flange 34b is regulated. Since the screw portion 43d of the spectrometer fixing screw 43 is screwed with the screw hole 12d of the carriage 12, the spectrometer fixing screw 43 moves up and down with respect to the carriage 12 by performing an operation to rotate the head portion 43a. In accordance with the vertical movement of the spectrometer fixing screw 43, the flange 34b moves up and down. Accordingly, it is possible to adjust the distance between the carriage 12 and the flange 34b by adjusting a rotation angle of the head portion 43a.

The shape of the pedestal portion 43c of the spectrometer fixing screw 43 is hemispherical on the −Z direction side. The +Z direction side of the through-hole 34c of the flange 34b is hemispherically recessed. The hemispherical portions of the pedestal portion 43c and the through-hole 34c come into contact with each other. The diameter of the thin portion of the through-hole 34c is larger than the diameter of the screw portion 43d of the spectrometer fixing screw 43. Accordingly, an angle formed by a surface of the flange 34b and a longitudinal direction of the spectrometer fixing screw 43 is adjustable. On the other hand, since the screw portion 43d of the spectrometer fixing screw 43 is screwed into the screw hole 12d of the carriage 12, an angle formed by a surface of the carriage 12 and the longitudinal direction of the spectrometer fixing screw 43 is fixed. Accordingly, the angle formed by the surface of the carriage 12 and the surface of the flange 34b is adjustable.

The screw portion 47d of the locking screw 47 is screwed into the screw hole 34d of the flange 34b. For this reason, it is possible to change a distance between the pedestal portion 47c of the locking screw 47 and the flange 34b by rotating the head portion 47a of the locking screw 47. The pedestal portion 43c of the spectrometer fixing screw 43 is disposed between the pedestal portion 47c of the locking screw 47 and the flange 34b. By rotating the head portion 47a of the locking screw 47 to move the pedestal portion 47c of the locking screw 47 toward the flange 34b, can be pressed against the pedestal portion 43c of the spectrometer fixing screw 43 the pedestal portion 47c of the locking screw 47. At this time, the friction between the pedestal portion 47c of the locking screw 47 and the pedestal portion 43c of the spectrometer fixing screw 43 is increased so that the rotation of the spectrometer fixing screw 43 can be suppressed.

The locking screws 47 are disposed on both sides in the Y direction with the spectrometer fixing screw 43 interposed therebetween. Each locking screw 47 presses the pedestal portion 43c of the spectrometer fixing screw 43 against the flange 34b. Accordingly, the locking screw 47 can reliably suppress the rotation of the spectrometer fixing screw 43.

In FIG. 8, the flange 34b is oblique to the carriage 12. At this time, since a spherical surface of the pedestal portion 43c of the spectrometer fixing screw 43 and a spherical surface of the through-hole 34c of the flange 34b are in contact with each other, the spectrometer fixing screw 43 can press the flange 34b. The locking screw 47 presses the pedestal portion 43c of the spectrometer fixing screw 43 against the flange 34b from both sides of the +Y direction side and the −Y direction side of the spectrometer fixing screw 43. Accordingly, the locking screw 47 can reliably suppress the rotation of the spectrometer fixing screw 43.

Figure 9:
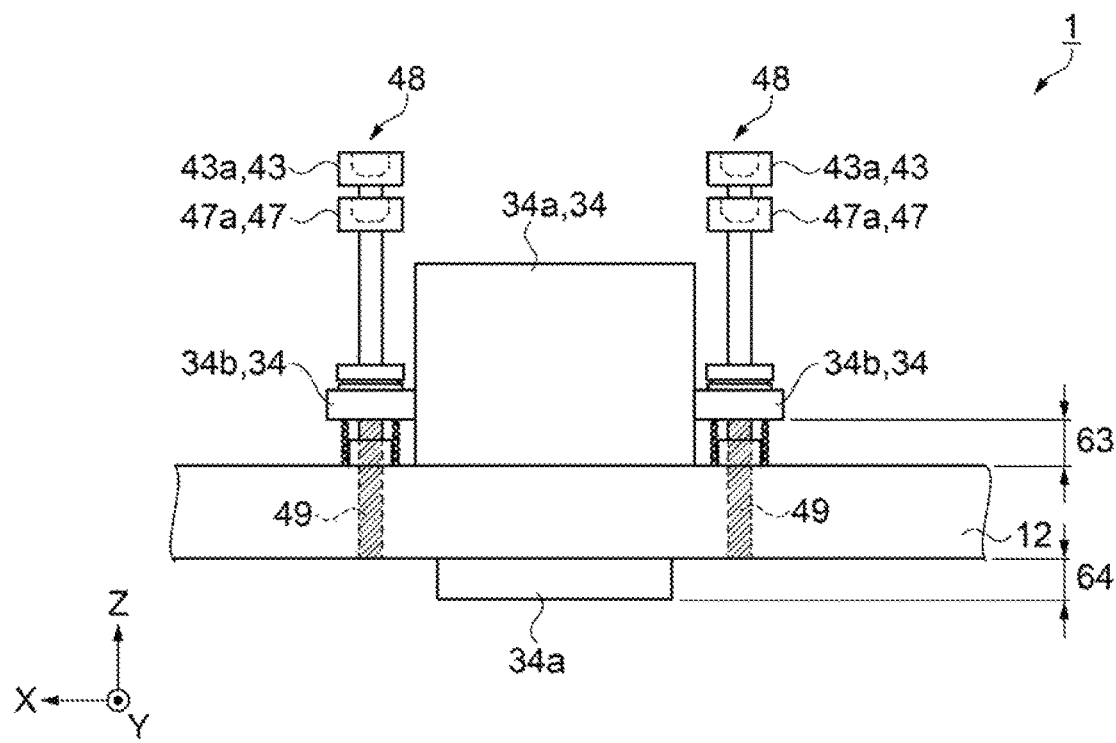
FIG. 9 is a schematic view for describing raising/lowering adjustment of the spectrometer.
Figure 10:
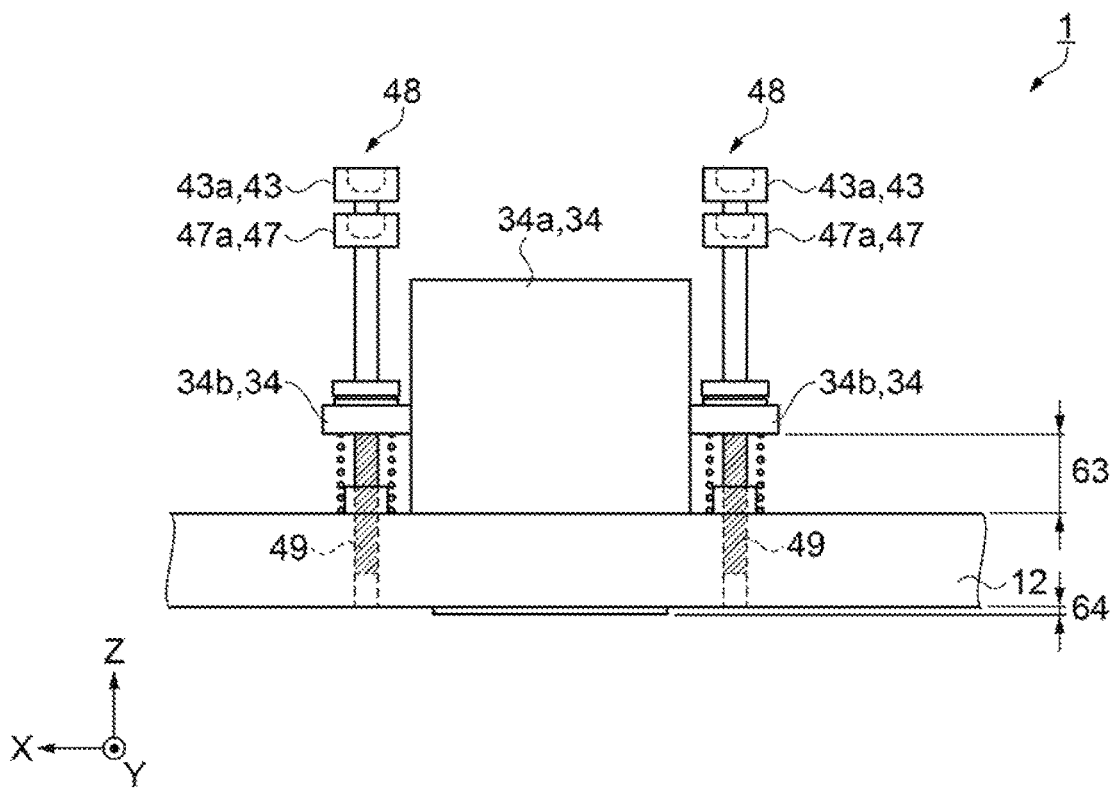
FIG. 10 is a schematic view for describing the raising/lowering adjustment of the spectrometer.

FIGS. 9 and 10 are schematic views for describing a raising/lowering adjustment of the spectrometer, and are views of the spectrometer 34 installed in the carriage 12 seen from the Y direction. As illustrated in FIGS. 9 and 10, the spectrometer fixing screws 43 disposed in the ±X direction of the spectrometer 34 are expanded and contracted in the same direction. At this time, it is possible to raise/lower the spectrometer 34 with respect to the carriage 12.

The distance between a −Z direction side surface of the flange 34b and a +Z direction side surface of the carriage 12 is defined as a first distance 63. The length of the body portion 34a projecting toward the −Z direction side with respect to the carriage 12 is defined as a second distance 64. As illustrated in FIG. 9, when the spectrometer fixing screw 43 is rotated to shorten the first distance 63, the second distance 64 is lengthened. At this time, a distance between the spectrometer 34 and the printing medium 14 is shortened. As illustrated in FIG. 10, when the spectrometer fixing screw 43 is rotated to lengthen the first distance 63, the second distance 64 is shortened. At this time, the distance between the spectrometer 34 and the printing medium 14 is lengthened. In this way, it is possible to adjust the distance between the spectrometer 34 and the printing medium 14 by operating the spectrometer fixing screw 43.

Figure 11:
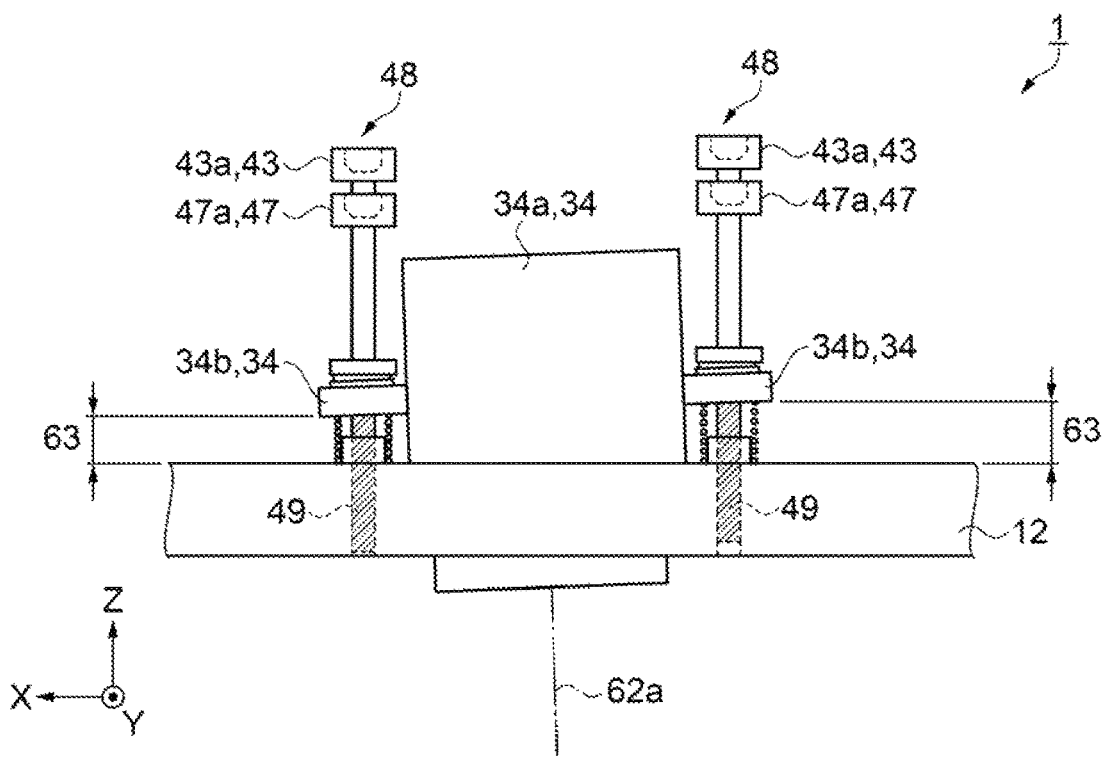
FIG. 11 is a schematic view for describing adjustment of the spectrometer around a Y direction.
Figure 12:
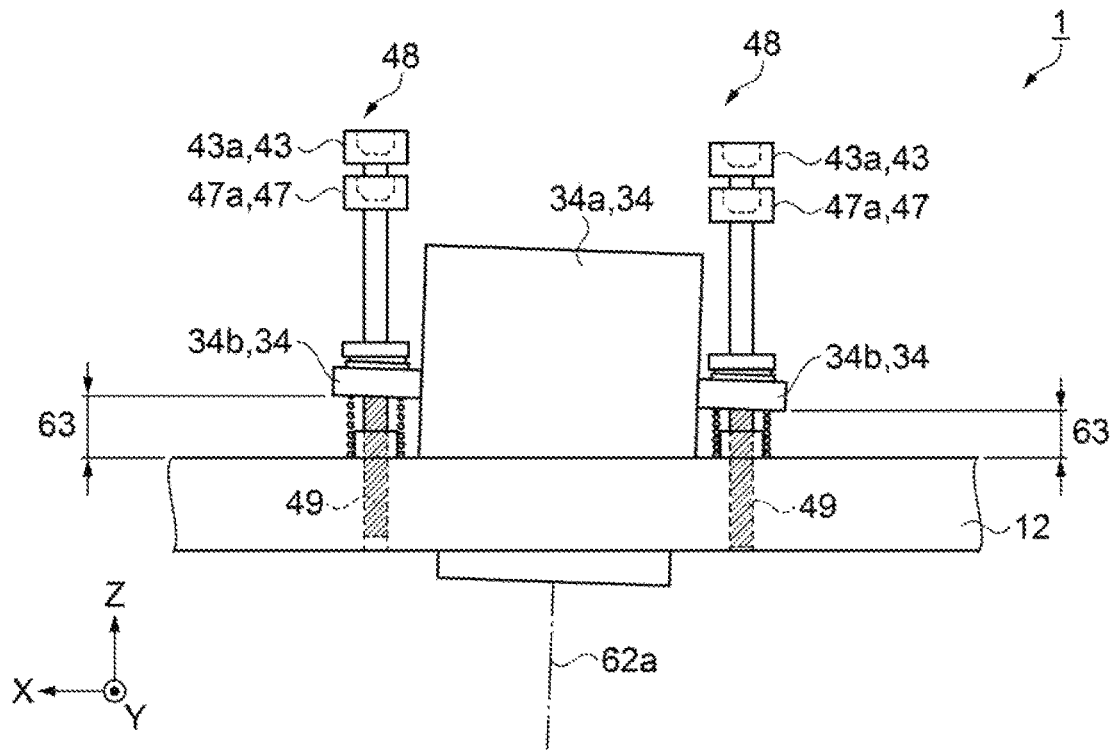
FIG. 12 is a schematic view for describing the adjustment of the spectrometer around the Y direction.

FIGS. 11 and 12 are schematic views for describing the adjustment of the spectrometer around the Y direction, and are views of the spectrometer 34 installed in the carriage 12 seen from a Y direction side. As illustrated in FIGS. 11 and 12, the spectrometer fixing screws 43 disposed in the ±X direction of the spectrometer 34 are adjusted. At this time, it is possible to incline the spectrometer 34 with respect to the carriage 12 with the Y direction as an axis.

As illustrated in FIG. 11, when the spectrometer fixing screw 43 is rotated to make the first distance 63 on the +X direction side shorter than the first distance 63 on the −X direction side, the optical axis 62a faces the −X direction side. As illustrated in FIG. 12, when the spectrometer fixing screw 43 is rotated to make the first distance 63 on the +X direction side longer than the first distance 63 on the −X direction side, the optical axis 62a faces the +X direction side. In this way, it is possible to adjust the direction in which the optical axis 62a faces in the X direction by operating the spectrometer fixing screw 43.

Figure 13:
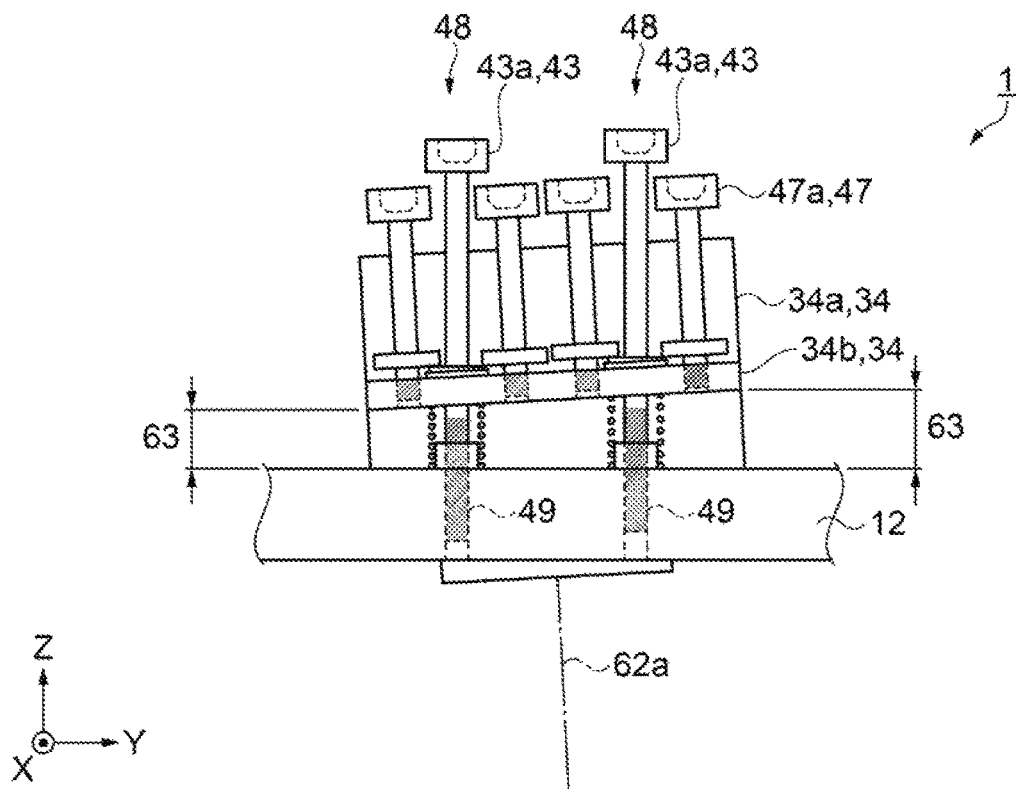
FIG. 13 is a schematic view for describing adjustment of the spectrometer around an X direction.
Figure 14:
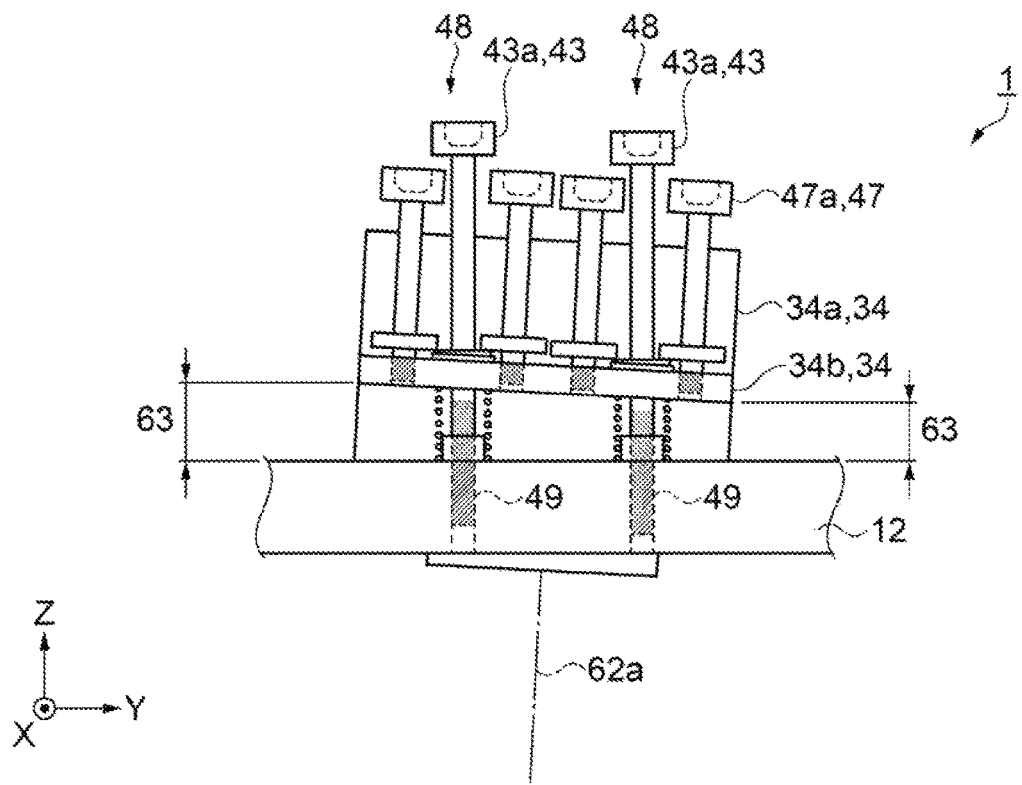
FIG. 14 is a schematic view for describing the adjustment of the spectrometer around the X direction.

FIGS. 13 and 14 are schematic views for describing the adjustment of the spectrometer around the X direction, and are views of the spectrometer 34 installed in the carriage 12 seen from an X direction side. As illustrated in FIGS. 13 and 14, the spectrometer fixing screws 43 disposed in the ±Y direction of the spectrometer 34 are adjusted. At this time, it is possible to incline the spectrometer 34 with respect to the carriage 12 with the X direction as an axis.

As illustrated in FIG. 13, when the spectrometer fixing screw 43 is rotated to make the first distance 63 on the +Y direction side longer than the first distance 63 on the −Y direction side, the optical axis 62a faces the +Y direction side. As illustrated in FIG. 14, when the spectrometer fixing screw 43 is rotated to make the first distance 63 on the +Y direction side shorter than the first distance 63 on the −Y direction side, the optical axis 62a faces the −Y direction side. In this way, it is possible to adjust the direction in which the optical axis 62a faces in the Y direction by operating the spectrometer fixing screw 43.

In this way, the second adjustment mechanism 48 includes three linear motion mechanisms 49. When each linear motion mechanism 49 moves by the same length, the first distance 63 which is the distance of the spectrometer 34 with respect to the carriage 12 can be adjusted. When one of the three linear motion mechanisms 49 moves, the inclination of the spectrometer 34 with respect to the carriage 12 can be adjusted. That is, the spectrometer 34 can be rotated around one direction as an axis.

By changing the linear motion mechanism 49 to be moved, it is possible to adjust a direction in which the spectrometer 34 is inclined with respect to the carriage 12. That is, the spectrometer 34 can be rotated around another direction as an axis. Accordingly, the second adjustment mechanism 48 can adjust the position and inclination of the spectrometer 34 with respect to the carriage 12.

Figure 15:
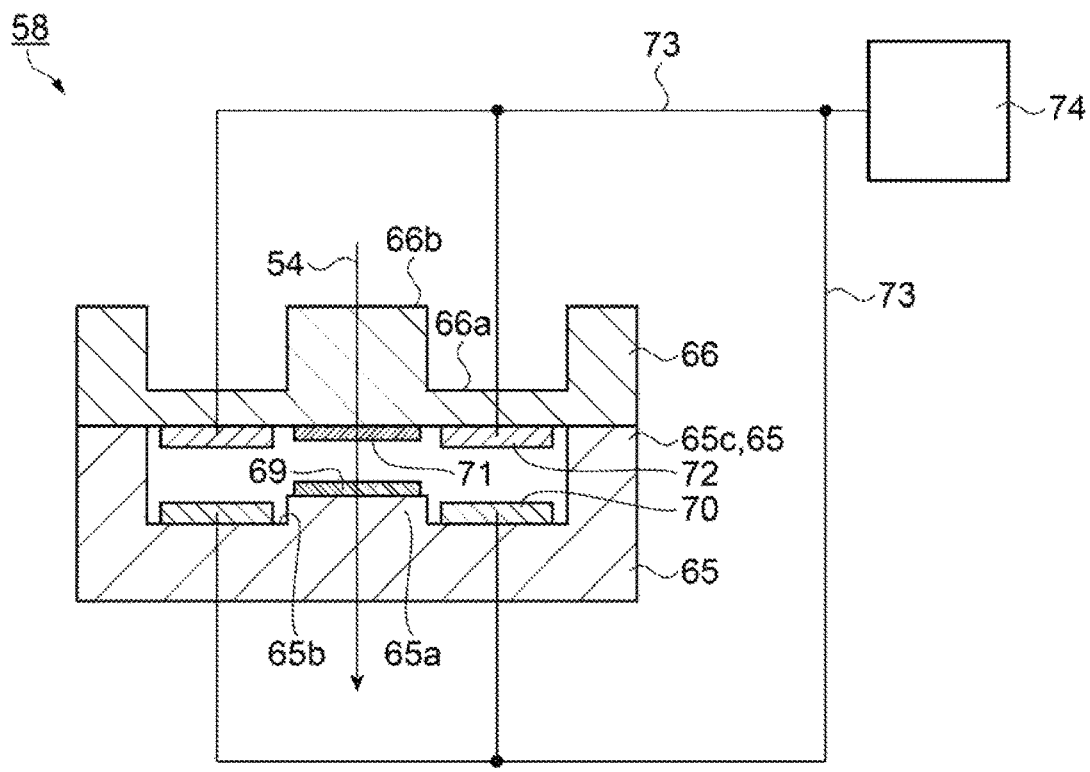
FIG. 15 is a schematic side sectional view illustrating a structure of a wavelength variable filter.

FIG. 15 is a schematic side sectional view illustrating a structure of a wavelength variable filter. As illustrated in FIG. 15, the wavelength variable filter 58 includes a fixed substrate 65 and a movable substrate 66. The fixed substrate 65 has a rectangular plate shape. A reflective film installation portion 65a that projects in a cylindrical shape is provided at a center of the fixed substrate 65. An electrode installation groove 65b recessed in an annular shape surrounding the reflective film installation portion 65a is installed. A first joining portion 65c that projects toward the movable substrate 66 side is installed around the electrode installation groove 65b. The first joining portion 65c is a portion joined with the movable substrate 66.

The material of the fixed substrate 65 is a material that transmits the light 54, and there is no particular limitation as long as it has strength. Silicate glass is used as the material of the fixed substrate 65. A first reflective film 69 is installed in the reflective film installation portion 65a. A first electrode 70 is installed in the electrode installation groove 65b. The first electrode 70 has an annular shape.

An annular groove 66a surrounding the center is installed on the movable substrate 66. A cylindrical portion surrounded by the groove 66a is defined as a movable portion 66b. The movable portion 66b is disposed to face the reflective film installation portion 65a of the fixed substrate 65. Since a thickness of the movable substrate 66 is thin at the groove 66a, the movable portion 66b can easily move in the vertical direction in the drawing. The material of the movable substrate 66 transmits the light 54. Silicate glass is used as the material of the movable substrate 66.

A second reflective film 71 is installed on a surface of the movable portion 66b on the fixed substrate 65 side. The first reflective film 69 and the second reflective film 71 are disposed to face each other. A second electrode 72 is disposed around the second reflective film 71 on a surface of the movable substrate 66 on the fixed substrate 65 side. The first electrode 70 and the second electrode 72 are disposed to face each other.

The first electrode 70 and the second electrode 72 are electrically connected to the filter drive circuit 74 by a wiring 73. The filter drive circuit 74 controls a voltage applied between the first electrode 70 and the second electrode 72. By changing the voltage between the first electrode 70 and the second electrode 72, the electrostatic force applied between the first electrode 70 and the second electrode 72 changes. The filter drive circuit 74 controls the distance between the first reflective film 69 and the second reflective film 71 by controlling the voltage applied between the first electrode 70 and the second electrode 72.

By controlling the distance between the first reflective film 69 and the second reflective film 71, it is possible to control a half value width of the wavelength of the light 54 transmitted through the first reflective film 69 and the second reflective film 71. The thickness of the wavelength variable filter 58 is 2 mm or less, and the spectrometer 34 can be downsized using the wavelength variable filter 58.

Figure 16:
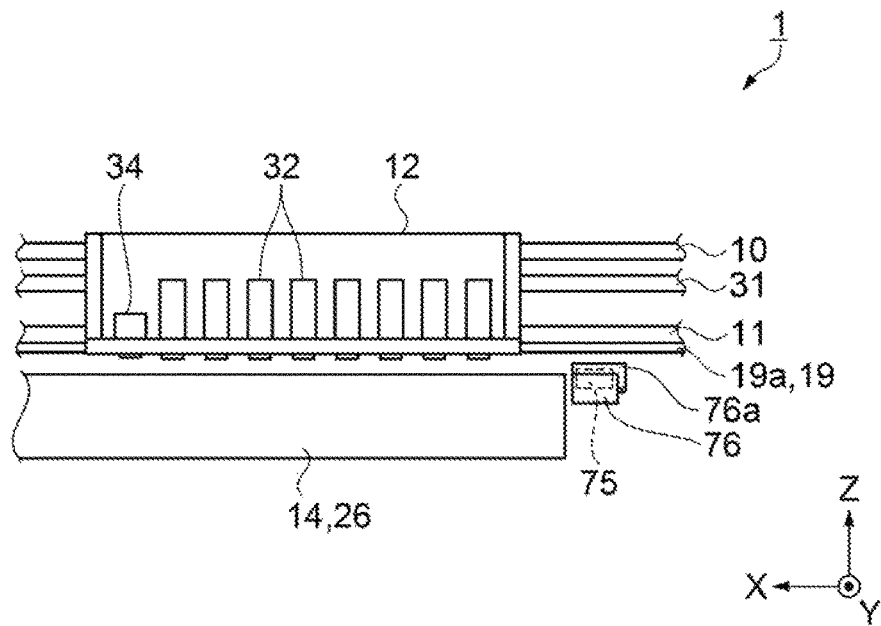
FIG. 16 is a schematic view for describing a relationship between a white board and the carriage.
Figure 17:
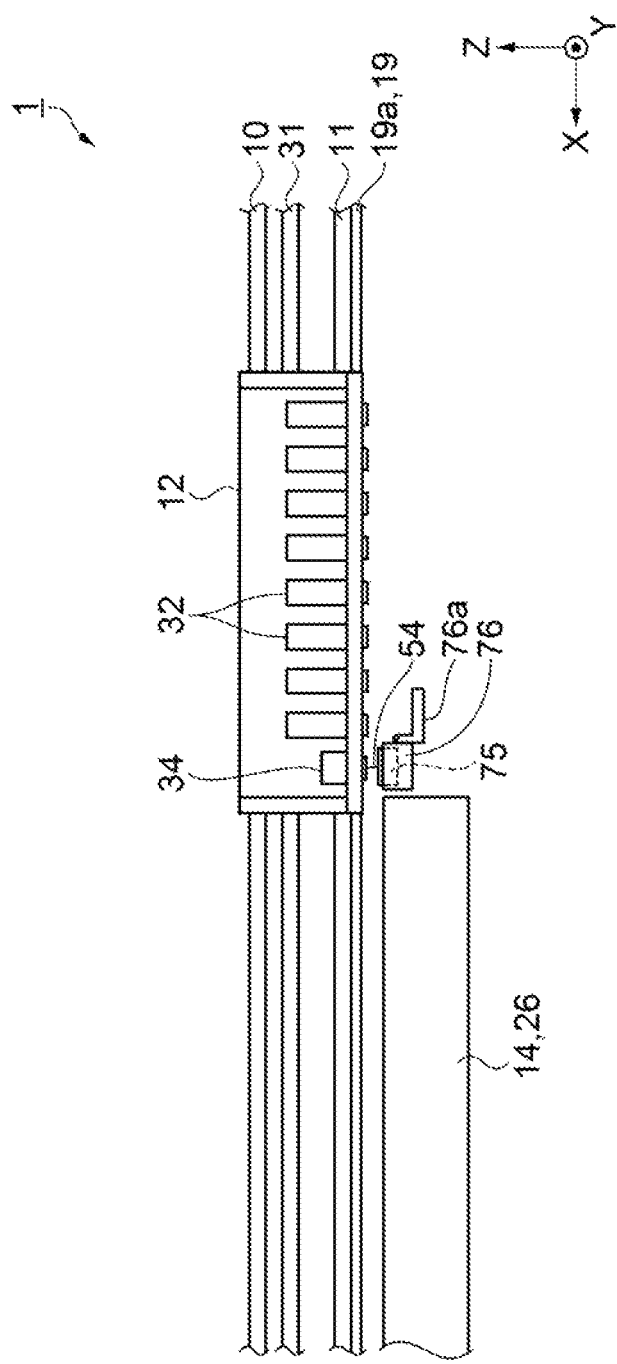
FIG. 17 is a schematic view for describing the relationship between the white board and the carriage.

FIGS. 16 and 17 are schematic views for describing the relationship between the white board and the carriage. As illustrated in FIG. 16, a white board 75 and a support portion 76 that supports the white board 75 are installed on the leg portion 2 on the −X direction side of the platen 26. The white board 75 is a board that reflects the light 54 emitted from the spectrometer 34, and is used when calibrating the spectrometer 34. The support portion 76 has a lid portion 76a as a cover. The lid portion 76a can cover the white board 75 so as to be openable and closable. A device for opening and closing the lid portion 76a is incorporated in the support portion 76. The device for opening and closing is electrically connected to the control unit 6 by a wiring (not illustrated). The lid portion 76a is opened and closed by a control signal of the control unit 6.

When the white board 75 is not used, the lid portion 76a is closed. At this time, the white board 75 is covered with the lid portion 76a. When the ink 36 is discharged from the head unit 32 for printing, mist of the ink 36 is generated. Even then, the lid portion 76a can suppress contamination of the white board 75.

As illustrated in FIG. 17, the spectrometer 34 is moved in the −X direction by the carriage 12. On the leg portion 2, the white board 75 is installed at a position facing a range where the spectrometer 34 moves. Accordingly, it is possible to easily move the spectrometer 34 to a position facing the white board 75. The support portion 76 opens the lid portion 76a to expose the white board 75. The carriage 12 moves to move the spectrometer 34 to the position facing the white board 75. The spectrometer 34 irradiates the white board 75 with the light 54 so that an output of the spectrometer 34 can be calibrated.

The spectrometer 34 emits the light 54 to the white board 75, and the white board 75 reflects the light 54. The spectrometer 34 detects the reflected light 54. The spectrometer 34 outputs a signal corresponding to the intensity of the light 54 to be detected. When the posture of the spectrometer 34 with respect to the carriage 12 is appropriate, the sensitivity of the spectrometer 34 is better than when the posture of the spectrometer 34 with respect to the carriage 12 is not appropriate. Accordingly, when the posture of the spectrometer 34 with respect to the carriage 12 is appropriate, the output of the spectrometer becomes larger than when the posture of the spectrometer 34 with respect to the carriage 12 is not appropriate.

The second adjustment mechanism 48 is operated with reference to the output of the spectrometer 34. The posture of the spectrometer 34 with respect to the carriage 12 can be adjusted to an appropriate posture by operating the second adjustment mechanism 48.

Figure 18:
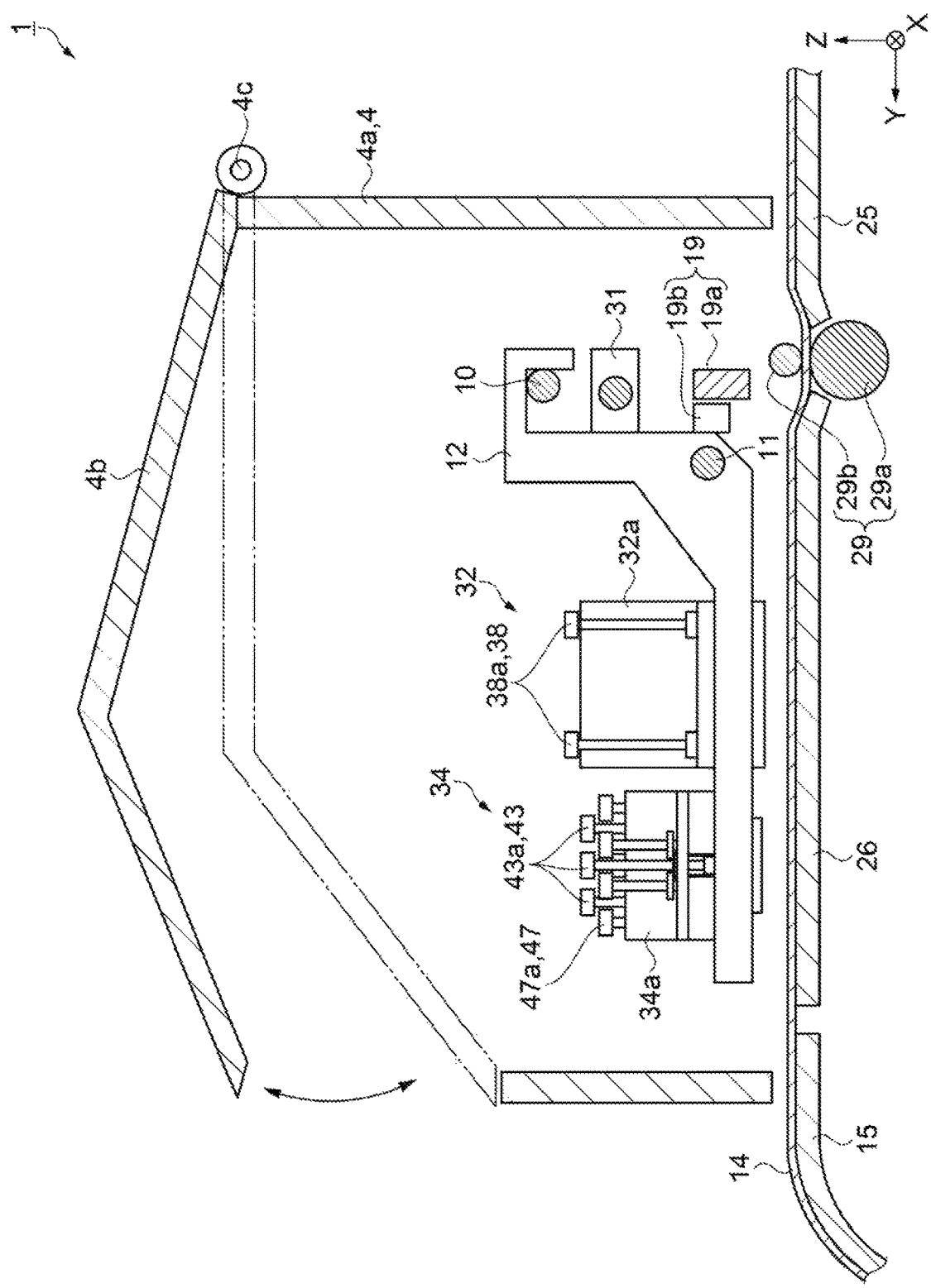
FIG. 18 is a schematic side sectional view illustrating a structure of a housing portion.

FIG. 18 is a schematic side sectional view illustrating a structure of a housing portion. As illustrated in FIG. 18, the housing portion 4 includes a housing body 4a on the −Z direction side. A housing lid portion 4b is provided on the +Z direction side of the housing body 4a. The housing body 4a is rotatably connected to the housing lid portion 4b by a hinge 4c. When opening the housing lid portion 4b with the hinge 4c as an axis, the head unit 32 and the spectrometer 34 are exposed. Since there is a space on the +Z direction side of the head unit 32 and the spectrometer 34, the operator can visually check and operate the head unit 32 and the spectrometer 34. Since the head portion 38a of the head fixing screw 38 is on the +Z direction side of the head unit 32, the operator can easily rotate the head portion 38a and detach the head unit 32 from the carriage 12 or attach the head unit 32 to the carriage 12.

Similarly, since the head portion 43a of the spectrometer fixing screw 43 and the head portion 47a of the locking screw 47 are on the +Z direction side of the spectrometer 34, the operator can easily operate the head portion 43a and the head portion 47a, and adjust the posture of the spectrometer 34.

Figure 19:
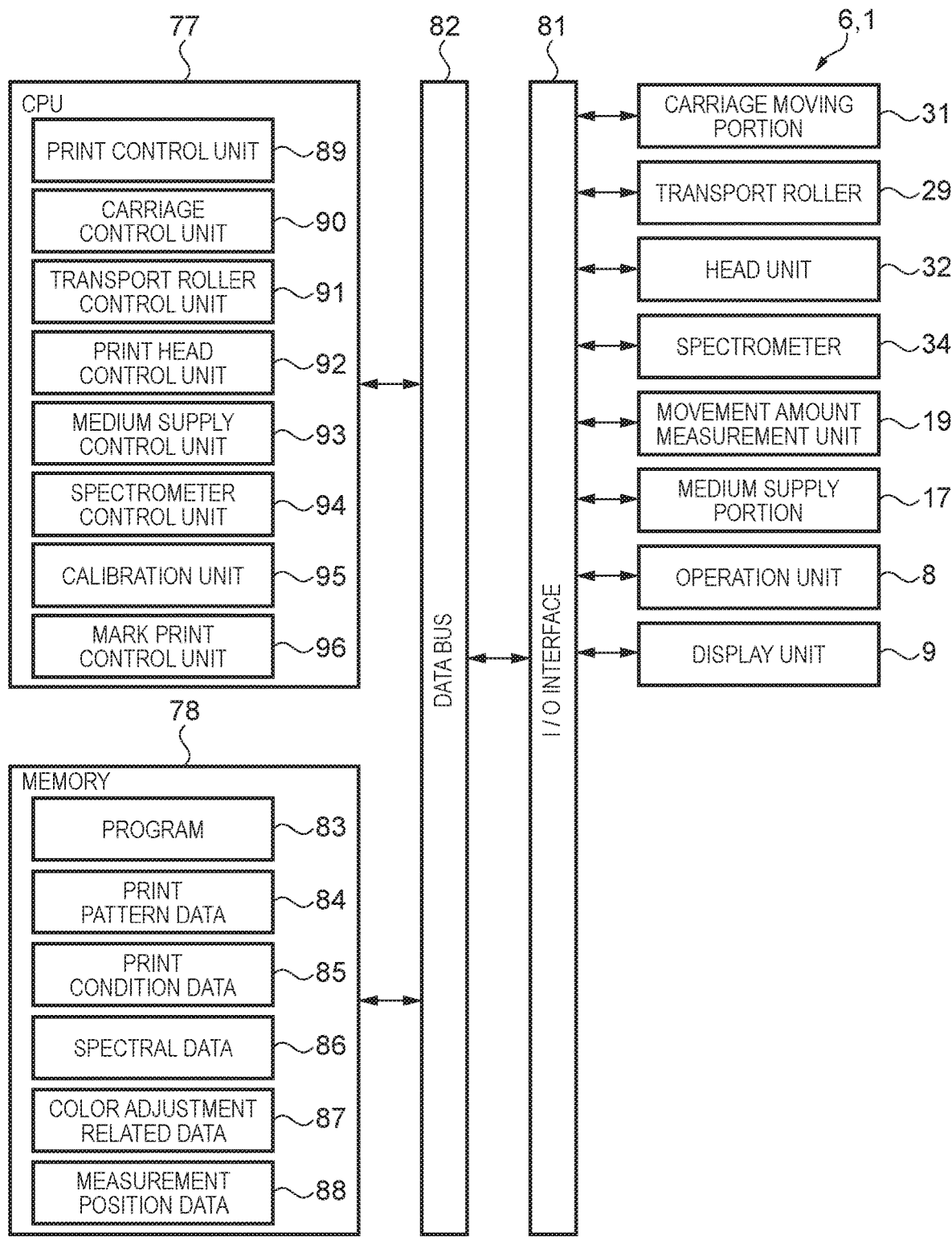
FIG. 19 is an electrical control block diagram of the printing apparatus.

FIG. 19 is an electrical control block diagram of the printing apparatus. In FIG. 19, the printing apparatus 1 includes the control unit 6 that controls the operation of the printing apparatus 1. The control unit 6 includes a CPU 77 (central processing device) as a processor which performs various kinds of arithmetic processing, and a memory 78 as a storage unit which stores various kinds of information. The carriage moving portion 31, the transport roller 29, the head unit 32, and the spectrometer 34 are connected to the CPU 77 via an I/O interface 81 and a data bus 82. The movement amount measurement unit 19, the medium supply portion 17, the operation unit 8, and the display unit 9 are also connected to the CPU 77 via the I/O interface 81 and the data bus 82.

The memory 78 is a concept including a semiconductor memory such as a RAM and a ROM, and an external storage device such as a hard disk. The memory 78 stores a program 83 in which control procedures of the operation of the printing apparatus and arithmetic procedures of distance measurement are described. The memory 78 stores print pattern data 84 to be printed by the head unit 32. The memory 78 stores print condition data 85 including the data such as driving conditions of the head unit 32. The memory 78 stores spectral data 86 indicating the distribution of the intensity with respect to the wavelength of the light 54 output from the spectrometer 34.

The memory 78 stores color adjustment related data 87 used for adjusting the color to be printed with reference to the spectral data 86. The memory 78 stores measurement position data 88 indicating a position of an image to be printed by the head unit 32 for the spectrometer 34 to measure. The memory 78 stores a relative position of the position where the head unit 32 prints the image and a position where the spectrometer 34 detects the light 54, and the position of the image. The memory 78 includes a storage area functioning as a work area for the CPU 77 to operate, a temporary file, or the like, and various other storage areas.

The CPU 77 drives the printing apparatus 1 according to the program 83 stored in the memory 78. The CPU 77 detects a spectrum of the light 54 reflected on the printing medium 14 and adjusts the colors when printing. The control unit 6 functions as a computer on which the CPU 77 is mounted. The CPU 77 operated by the program 83 has a print control unit 89 as a specific function performing unit. The print control unit 89 performs printing of a predetermined pattern with reference to the print pattern data 84 and the spectral data 86.

The CPU 77 has a carriage control unit 90. The carriage control unit 90 controls the movement of the carriage moving portion 31. The carriage control unit 90 receives the output of the movement amount measurement unit 19 and detects the position of the carriage 12. The carriage control unit 90 drives the carriage moving portion 31 to move the carriage 12 to a predetermined position.

The CPU 77 has a transport roller control unit 91. The transport roller control unit 91 drives the transport roller 29 to move the printing medium 14. At this time, the transport roller control unit 91 controls the movement amount of the printing medium 14.

The CPU 77 has a print head control unit 92. The print head control unit 92 controls the head unit 32 to discharge the ink 36 from a predetermined nozzle. The print control unit 89 integrally controls the carriage control unit 90, the transport roller control unit 91, and the print head control unit 92 to print a predetermined image on the printing medium 14.

The CPU 77 has a medium supply control unit 93. The medium supply control unit 93 controls the medium supply portion 17 and the medium winding portion 18 to supply the printing medium 14 to the supply port 28 at a predetermined speed.

The CPU 77 has a spectrometer control unit 94. The spectrometer control unit 94 drives the spectrometer 34 to detect the spectrum of a mark printed on the white board 75 or the printing medium 14.

The CPU 77 has a calibration unit 95. The spectrometer control unit 94 drives the spectrometer 34 to detect the spectrum of a mark printed on the white board 75 or the printing medium 14. The calibration unit 95 adjusts the ratio for printing dots of a plurality of colors when printing a predetermined color.

The CPU 77 has a mark print control unit 96. The mark print control unit 96 outputs an instruction signal to the print control unit 89 to draw an image for inspection on the printing medium 14. The print control unit 89 controls the head unit 32 to discharge the ink 36 from a predetermined nozzle. As a result, the image for inspection is printed at a predetermined position on the printing medium 14.

At this time, the carriage control unit 90 controls the movement of the carriage 12. The control unit 6 has the memory 78, and the memory 78 stores the measurement position data 88 indicating the position of the image printed by the head unit 32. The memory 78 stores the relative position of the position where the head unit 32 prints the image and the position where the spectrometer 34 detects the light 54. Accordingly, the carriage control unit 90 and the transport roller control unit 91 can move the spectrometer 34 to a position facing the image.

Figure 20:
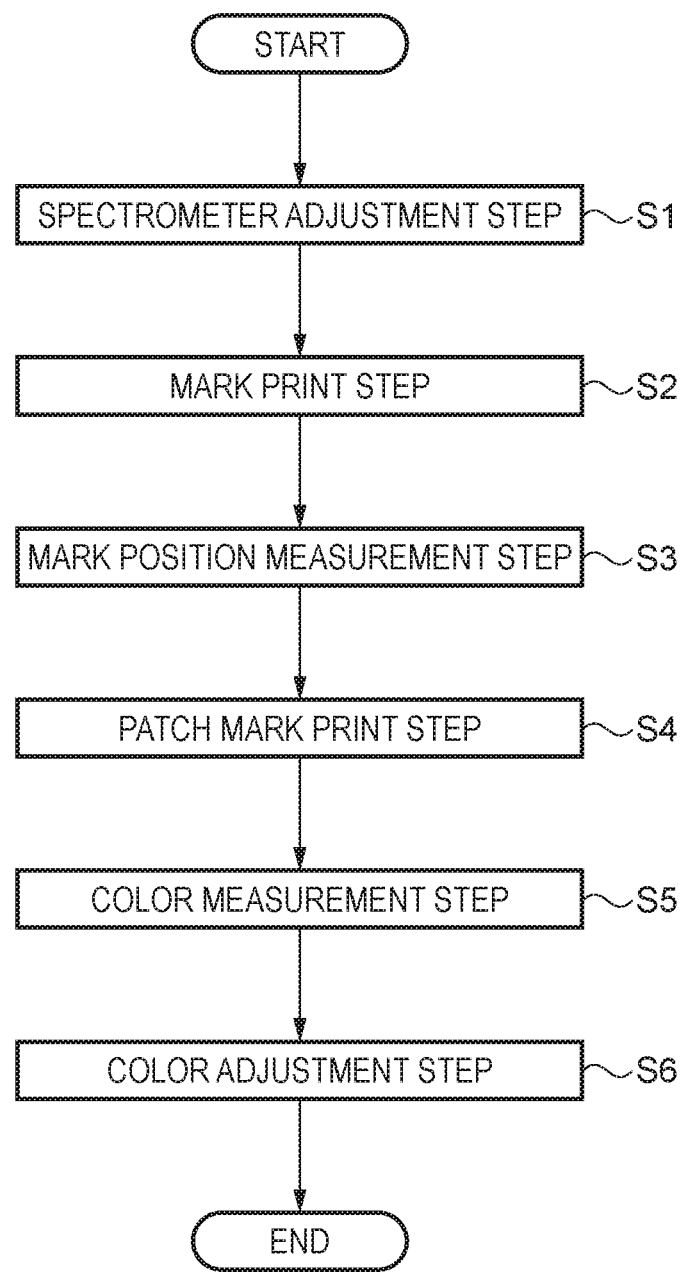
FIG. 20 is a flowchart for describing a print preparation method of the printing apparatus.

Next, a method of performing print preparation of the above-described printing apparatus 1 will be described with reference to FIGS. 20 to 33. FIG. 20 is a flowchart for describing the print preparation method of the printing apparatus, and FIGS. 21 to 33 are diagrams and graphs for describing the print preparation method of the printing apparatus. In the flowchart of FIG. 20, step S1 corresponds to a spectrometer adjustment step, and is a step for adjusting the posture of the spectrometer 34. Next, proceed to step S2. Step S2 is a mark print step. This step is a step in which the head unit 32 prints a position measurement mark on the printing medium 14. Next, proceed to step S3.

Step S3 is a mark position measurement step. This step is a step of measuring the position of the position measurement mark. Next, proceed to step S4. Step S4 is a patch mark print step. Marks of a plurality of colors printed for the measurement of the spectrum are called a patch mark. This step is a step of printing the patch mark on the printing medium 14. Next, proceed to step S5.

Step S5 is a color measurement step. This step is a step in which the spectrometer 34 measures the spectrum of the patch mark. Next, proceed to step S6. Step S6 is a color adjustment step. This step is a step in which the calibration unit 95 sets a ratio for printing dots of a plurality of colors when printing a predetermined color and stores the ratio in the memory 78 as the color adjustment related data 87. Through the above-described steps, the print preparation processing of the printing apparatus 1 is completed.

Figure 21:
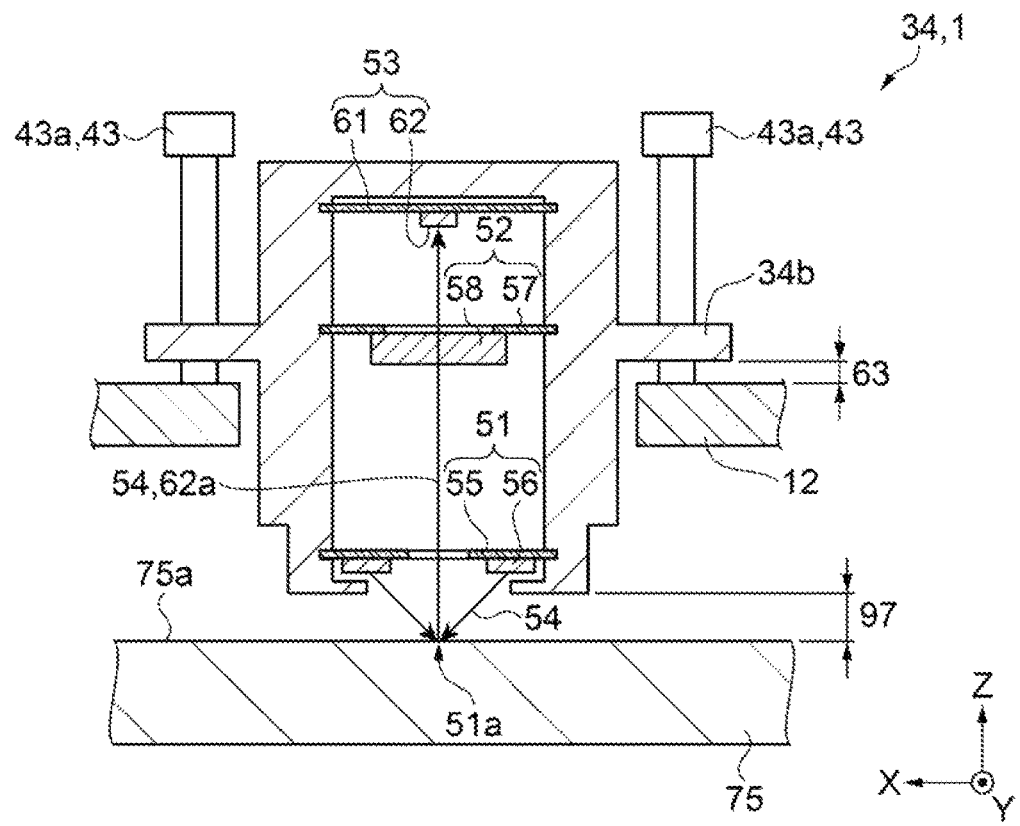
FIG. 21 is a diagram for describing the print preparation method of the printing apparatus.

Next, with reference to FIGS. 21 to 33, the print preparation method will be described in detail corresponding to the steps indicated in FIG. 20. FIGS. 21 to 26 are diagrams and graphs corresponding to the spectrometer adjustment step of step S1. As illustrated in FIG. 21, the spectrometer control unit 94 outputs an instruction signal to the carriage control unit 90 to move the spectrometer 34 to the position facing the white board 75. Since the white board 75 has a high reflectance, the light receiving element 62 can detect the light 54 with high sensitivity.

Next, the spectrometer control unit 94 emits the light 54 from the light source unit 51 to the white board 75. A portion of the light 54 reflected on the white board 75 passes through the filter unit 52, and is applied to the light receiving element 62 of the light receiving unit 53. The light receiving element 62 converts the intensity of the received light 54 into a voltage and outputs the voltage to an electric circuit installed on the third substrate 61. The electric circuit converts the voltage indicating the intensity of the light 54 into a digital signal and outputs the signal to the spectrometer control unit 94. The spectrometer control unit 94 displays the intensity of the light 54 received by the light receiving element 62 on the display unit 9. The operator looks at the display unit 9 and checks the intensity of the light 54 received by the light receiving element 62.

The distance between the spectrometer 34 and the white board 75 is defined as a gap distance 97. First, the gap distance 97 is adjusted. The gap distance 97 can be adjusted by adjusting the first distance 63 by performing an operation to rotate the spectrometer fixing screw 43. At this time, the three spectrometer fixing screws 43 are operated together. The spectrometer 34 is moved in a direction of the optical axis 62a.

Figure 22:
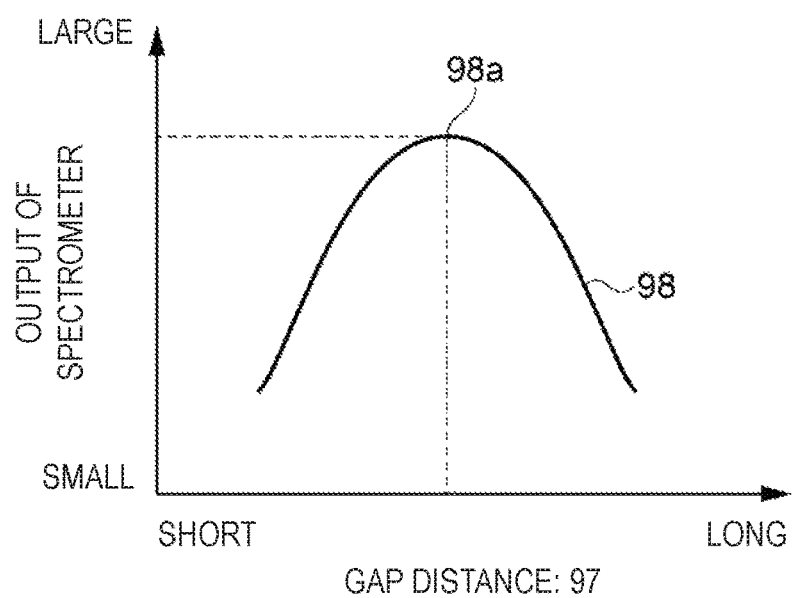
FIG. 22 is a graph for describing the print preparation method of the printing apparatus.

FIG. 22 is a graph showing a relationship between the output of the spectrometer and the gap distance. In FIG. 22, the horizontal axis indicates the gap distance 97, and the right side of FIG. 22 shows a longer distance than the left side. In FIG. 22, the vertical axis indicates the output of the spectrometer 34, and the upper side in FIG. 22 shows a larger output than the lower side. The output of the spectrometer 34 corresponds to the output voltage from the light receiving element 62. The stronger the intensity of the light 54 received by the light receiving element 62, the larger the output of the spectrometer 34. An output transition line 98 indicates the relationship between the gap distance 97 and the voltage output from the light receiving element 62. The shape of the output transition line 98 projects to the upper side of FIG. 22 and is a continuous curve having one peak 98a. The light source unit 51 has a structure in which the light 54 is focused on a predetermined point on the optical axis 62a. As illustrated in FIG. 21, a predetermined point on which the light 54 is focused is defined as a focal point 51a. Returning to FIG. 22, the intensity of the light 54 traveling toward the optical axis 62a increases when the focal point 51a is on a surface 75a of the white board 75. At this time, the output transition line 98 becomes the peak 98a. At the peak 98a, the output of the spectrometer 34 is maximized. The operator adjusts the gap distance 97 to maximize the output of the spectrometer 34.

Figure 23:
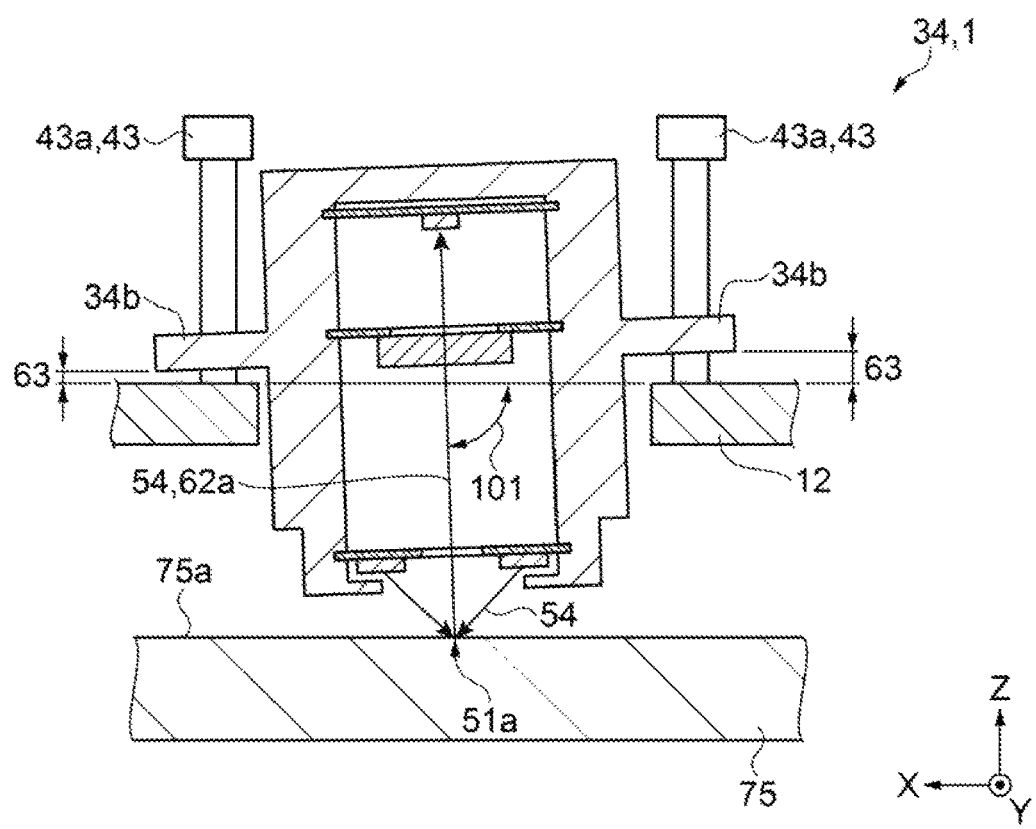
FIG. 23 is a diagram for describing the print preparation method of the printing apparatus.

Next, the inclination of the spectrometer 34 with respect to the carriage 12 with the Y direction as an axis is adjusted. As illustrated in FIG. 23, among the angles formed by a surface of the carriage 12 facing the flange 34b and the optical axis 62a, an angle with the Y direction as an axis is defined as a Y axis angle 101. The Y axis angle 101 is adjusted by adjusting the first distance 63 on the +X direction side and the first distance 63 on the −X direction side. When the angle formed by the surface 75a of the white board 75 and the optical axis 62a is vertical, the intensity of the light 54 traveling toward the optical axis 62a increases.

Figure 24:
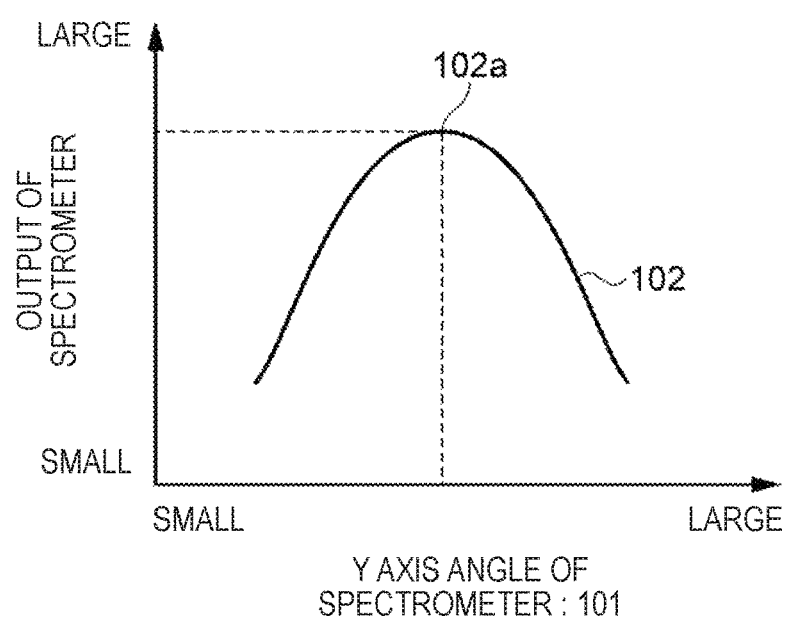
FIG. 24 is a graph for describing the print preparation method of the printing apparatus.

FIG. 24 is a graph showing a relationship between the output of the spectrometer and the Y axis angle of the spectrometer. In FIG. 24, the horizontal axis indicates the Y axis angle 101 of the spectrometer 34, and the right side of FIG. 24 shows a larger angle than the left side. In FIG. 24, the vertical axis indicates the output of the spectrometer 34, and the upper side in FIG. 24 shows a larger output than the lower side. The output of the spectrometer 34 corresponds to the output voltage from the light receiving element 62. An output transition line 102 indicates the relationship between the Y axis angle 101 of the spectrometer 34 and the voltage output from the light receiving element 62. The shape of the output transition line 102 projects to the upper side of FIG. 24 and is a continuous curve having one peak 102a. When the angle formed by the surface 75a of the white board 75 and the optical axis 62a around the Y axis is vertical, the output transition line 102 becomes the peak 102a. At the peak 102a, the output of the spectrometer 34 is maximized. The operator adjusts the Y axis angle 101 of the spectrometer 34 to maximize the output of the spectrometer 34.

Figure 25:
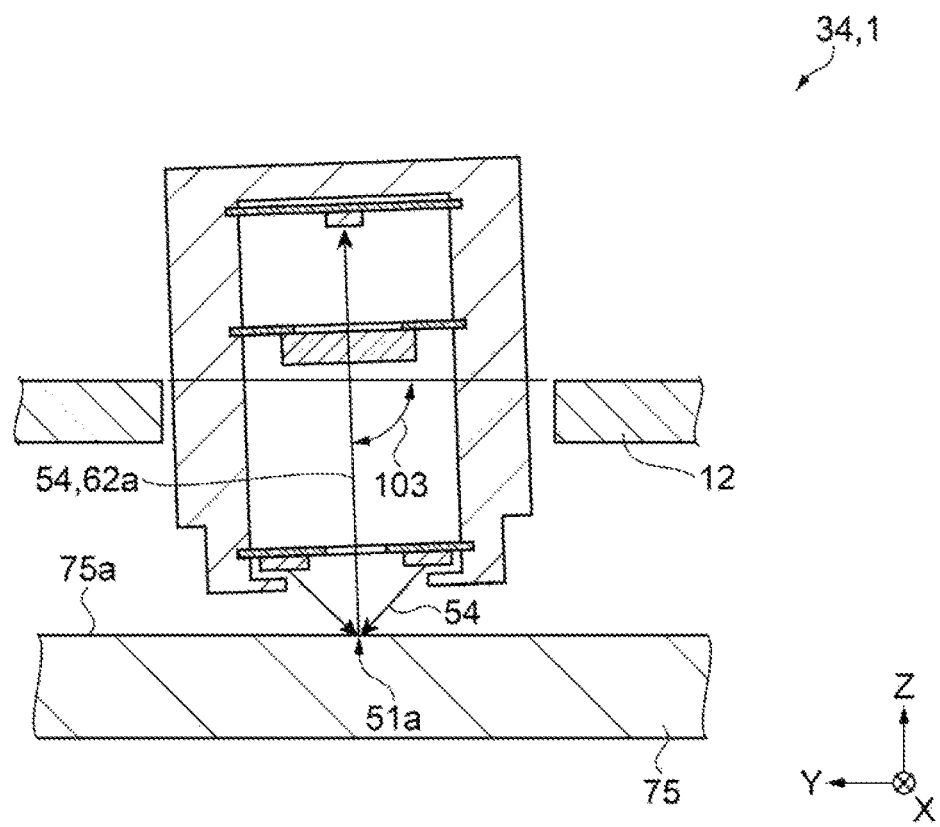
FIG. 25 is a diagram for describing the print preparation method of the printing apparatus.

Next, the inclination of the spectrometer 34 with respect to the carriage 12 with the X direction as an axis is adjusted. As illustrated in FIG. 25, among the angles formed by a surface of the carriage 12 facing the flange 34b and the optical axis 62a, an angle with the X direction as an axis is defined as an X axis angle 103. As illustrated in FIGS. 13 and 14, the operator performs an operation to rotate the spectrometer fixing screw 43 and adjusts the first distance 63 on the +Y direction side and the first distance 63 on the −Y direction side. By this operation, the operator adjusts the X axis angle 103. When the angle formed by the surface 75a of the white board 75 and the optical axis 62a is vertical, the intensity of the light 54 traveling toward the optical axis 62a increases.

Figure 26:
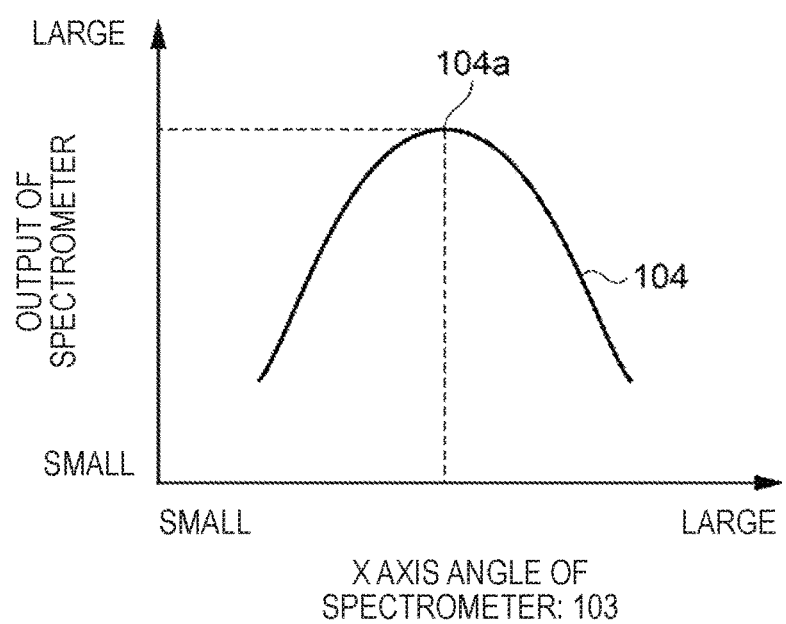
FIG. 26 is a graph for describing the print preparation method of the printing apparatus.

FIG. 26 is a graph showing a relationship between the output of the spectrometer and the X axis angle of the spectrometer. In FIG. 26, the horizontal axis indicates the X axis angle 103 of the spectrometer 34, and the right side of FIG. 26 shows a larger angle than the left side. In FIG. 26, the vertical axis indicates the output of the spectrometer 34, and the upper side in FIG. 26 shows a larger output than the lower side. The output of the spectrometer 34 corresponds to the output voltage from the light receiving element 62. An output transition line 104 indicates the relationship between the X axis angle 103 of the spectrometer 34 and the voltage output from the light receiving element 62. The shape of the output transition line 104 projects to the upper side of FIG. 26 and is a continuous curve having one peak 104a. When the angle formed by the surface 75a of the white board 75 and the optical axis 62a around the X axis is vertical, the output transition line 104 becomes the peak 104a. At the peak 104a, the output of the spectrometer 34 is maximized. The operator adjusts the X axis angle 103 of the spectrometer 34 to maximize the output of the spectrometer 34.

Figure 27:
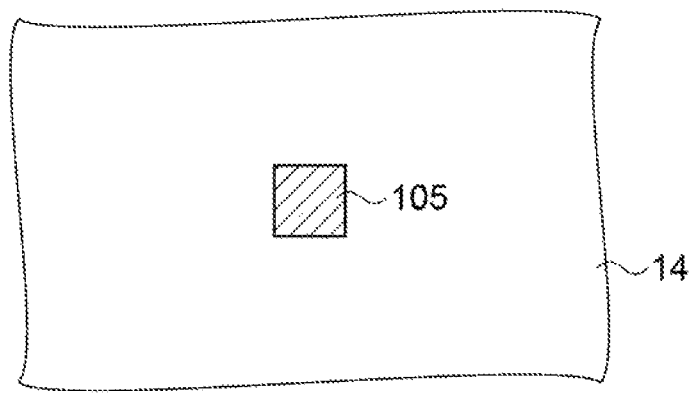
FIG. 27 is a diagram for describing the print preparation method of the printing apparatus.

FIG. 27 is a diagram corresponding to the mark print step of step S2. As illustrated in FIG. 27, the print control unit 89 prints a measurement mark 105 as an image on the printing medium 14. The shape of the measurement mark 105 is not limited, but in the present embodiment, for example, it is a square shape. The print control unit 89 outputs an instruction signal to the carriage control unit 90, the transport roller control unit 91, and the print head control unit 92. The carriage control unit 90 drives the carriage moving portion 31 to control the position of the carriage 12. The transport roller control unit 91 drives the transport roller 29 to control the position of the printing medium 14. The print head control unit 92 drives the head unit 32 to control the discharge timing of the ink 36.

The print control unit 89 controls the position of the carriage 12, the position of the printing medium 14, and the discharge timing of the ink 36 to print the measurement mark 105 on the printing medium 14. The print control unit 89 stores data indicating the position of the measurement mark 105 in the memory 78 as a portion of the measurement position data 88.

Figure 28:
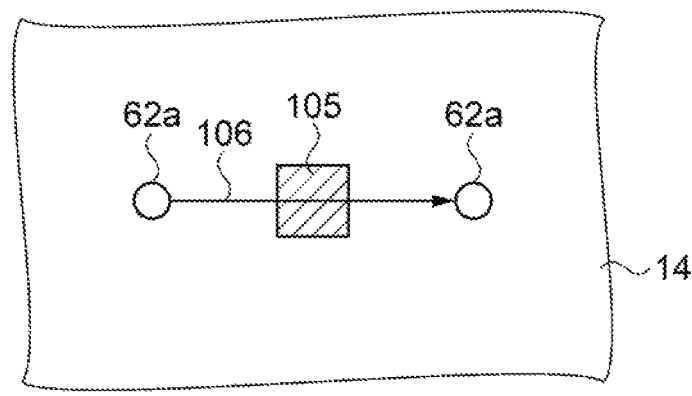
FIG. 28 is a diagram for describing the print preparation method of the printing apparatus.
Figure 28:
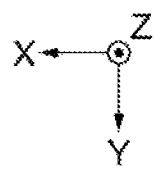

FIGS. 28 to 31 are diagrams and graphs corresponding to mark position measurement step of the step S3. First, the relative position in the X direction of the measurement mark 105 and the spectrometer 34 is measured. As illustrated in FIG. 28, the transport roller control unit 91 controls the position of the printing medium 14 in the Y direction so that an optical axis locus 106, which is a locus of the optical axis 62a, passes through the measurement mark 105. The carriage control unit 90 drives the carriage moving portion 31 to move the carriage 12 in the −X direction so that the optical axis 62a passes through the measurement mark 105. Since the spectrometer 34 is installed in the carriage 12, the optical axis 62a of the light receiving element 62 can be moved as the carriage control unit 90 moves the carriage 12.

The printing medium 14 is white and the measurement mark 105 is black. The measurement mark 105 has a smaller reflectance than the printing medium 14. Accordingly, when the optical axis 62a is not on the measurement mark 105, the light receiving element 62 receives the intense light 54 reflected on the white printing medium 14, and thereby the output of the spectrometer 34 is large. When the optical axis 62a is not on the measurement mark 105, the light receiving element 62 receives the weak light 54 reflected on the black measurement mark 105, and thereby the output of the spectrometer 34 is small.

When the optical axis 62a is around the measurement mark 105, the light receiving element 62 receives a portion of the intense light 54 reflected on the white printing medium 14, and a portion of the weak light 54 reflected on the black measurement mark 105. Accordingly, as the optical axis 62a approaches the center from outside the measurement mark 105, the output of the spectrometer 34 becomes small.

Figure 29:
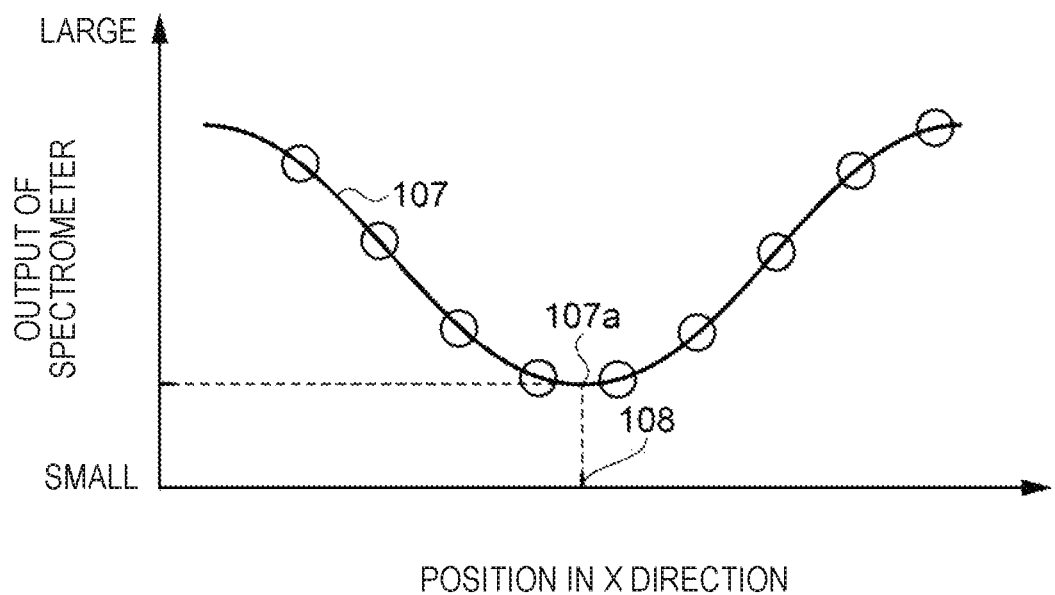
FIG. 29 is a graph for describing the print preparation method of the printing apparatus.

FIG. 29 is a graph showing a relationship between the output of the spectrometer and the position of the optical axis of the light receiving element in the X direction. In FIG. 29, the horizontal axis indicates the position of the optical axis 62a of the light receiving element 62 in the X direction. In FIG. 29, the vertical axis indicates the output of the spectrometer 34, and the upper side in FIG. 29 shows a larger output than the lower side. The output of the spectrometer 34 corresponds to the output voltage from the light receiving element 62. O marks in FIG. 29 indicate a plot of measurement values. An approximate line 107 is an approximate line passing through the plot of the measurement values. The approximate line 107 is a line calculated using a calculation method such as a least squares method. The CPU 77 calculates a minimum point 107a at which the output of the spectrometer 34 becomes the minimum on the approximate line 107. The position in the X direction corresponding to the minimum point 107a is set as a measurement mark X coordinate 108. The measurement mark X coordinate 108 indicates the center position of the measurement mark 105 in the X direction.

In this way, the carriage 12 moves the spectrometer 34 to a position facing the measurement mark 105. The spectrometer 34 receives the light 54 reflected on the measurement mark 105 and outputs a signal corresponding to the intensity of the light 54 facing the measurement mark 105. Accordingly, when the carriage 12 moves the spectrometer 34, it is possible to detect whether or not the measurement mark 105 is located at a position facing the spectrometer 34. The movement amount measurement unit 19 measures the movement amount of the carriage 12. Accordingly, it is possible to detect the relative position in the X direction of the position where the head unit 32 prints the measurement mark 105 and the position where the spectrometer 34 detects the light 54.

Figure 30:
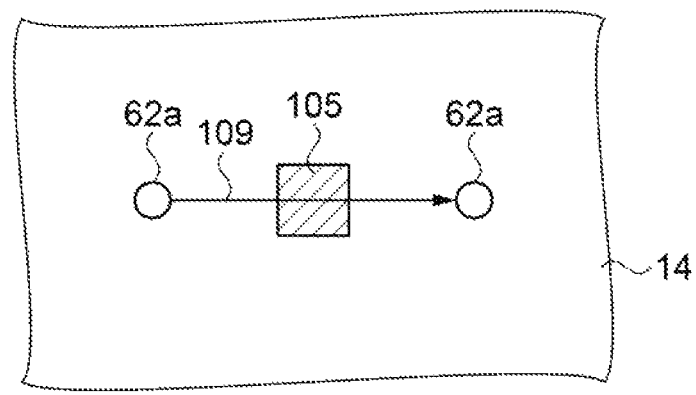
FIG. 30 is a diagram for describing the print preparation method of the printing apparatus.
Figure 30:
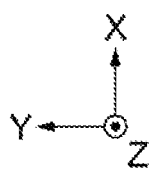

Next, the relative position of the measurement mark 105 and the spectrometer 34 in the Y direction is measured. As illustrated in FIG. 30, the carriage control unit 90 drives the carriage moving portion 31 to control the position of the carriage 12 in the Y direction so that the optical axis 62a passes through the measurement mark 105, and thereby an optical axis locus 109, which is a locus of the optical axis 62a, passes through the measurement mark 105. The transport roller control unit 91 drives the transport roller 29 to move the printing medium 14 in the +Y direction so that the optical axis 62a passes through the measurement mark 105. At this time, the optical axis 62a moves in −Y direction.

In this way, the transport roller 29 moves the printing medium 14 so that the measurement mark 105 is located at a position facing the spectrometer 34. The spectrometer 34 receives the light reflected on the measurement mark 105 and outputs the signal of the intensity of light corresponding to measurement mark 105. Accordingly, when the transport roller 29 moves the printing medium 14, it is possible to detect whether or not the spectrometer 34 is located at a position facing the measurement mark 105. Accordingly, it is possible to detect the relative position in the Y direction of the position where the head unit 32 prints the measurement mark 105 and the position where the spectrometer 34 detects the light.

Figure 31:
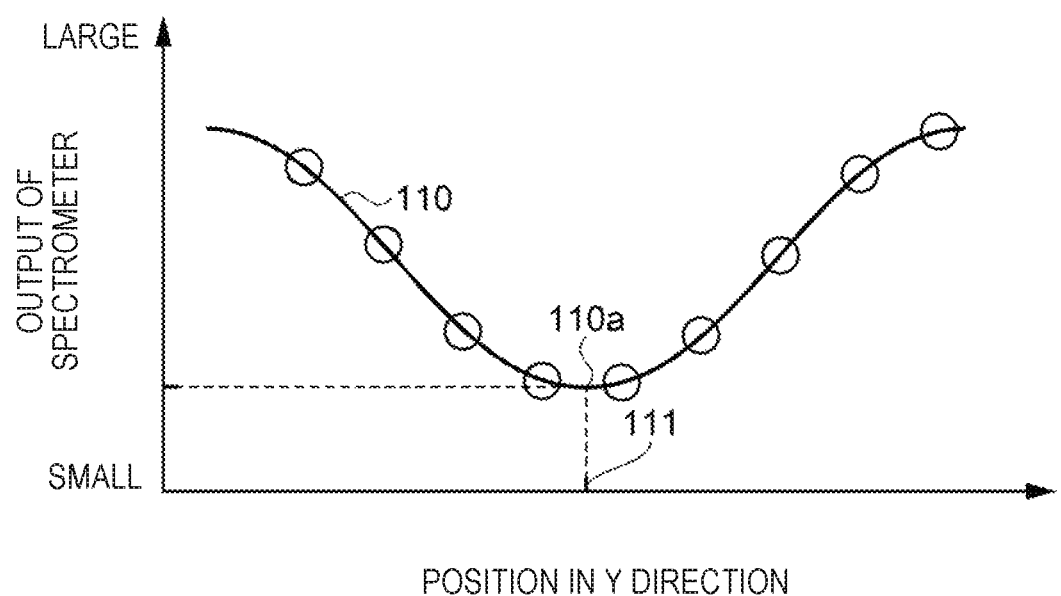
FIG. 31 is a graph for describing the print preparation method of the printing apparatus.

FIG. 31 is a graph showing a relationship between the output of the spectrometer and the position of the optical axis 62a in the Y direction. In FIG. 31, the horizontal axis indicates the position of the optical axis 62a in the Y direction. In FIG. 31, the vertical axis indicates the output of the spectrometer 34, and the upper side in FIG. 31 shows a larger output than the lower side. The output of the spectrometer 34 corresponds to the output voltage from the light receiving element 62. O marks in FIG. 31 indicate a plot of measurement values. An approximate line 110 is an approximate line passing through the plot of the measurement values. The approximate line 110 is a line calculated using a calculation method such as a least squares method. The CPU 77 calculates a minimum point 110a at which the output of the spectrometer 34 becomes the minimum on the approximate line 110. The position in the Y direction corresponding to the minimum point 110a is set as a measurement mark Y coordinate 111. The measurement mark Y coordinate 111 indicates the center position of the measurement mark 105 in the Y direction. The spectrometer control unit 94 stores the measurement mark X coordinate 108 and the measurement mark Y coordinate 111 in the memory 78 as a portion of the measurement position data 88.

The spectrometer control unit 94 calculates a relative position coordinate which is a coordinate indicating the relative position of the head unit 32 and the spectrometer 34 using the data on the position of the measurement mark 105 output from the print control unit 89, the measurement mark X coordinate 108, and the measurement mark Y coordinate 111. The relative position coordinates indicate the coordinates of the optical axis 62a of the spectrometer 34 with the coordinates of the head unit 32 as the origin. Accordingly, the relative position coordinates indicate the distance between the head unit 32 and the spectrometer 34 in the X direction and the distance in the Y direction.

Figure 32:
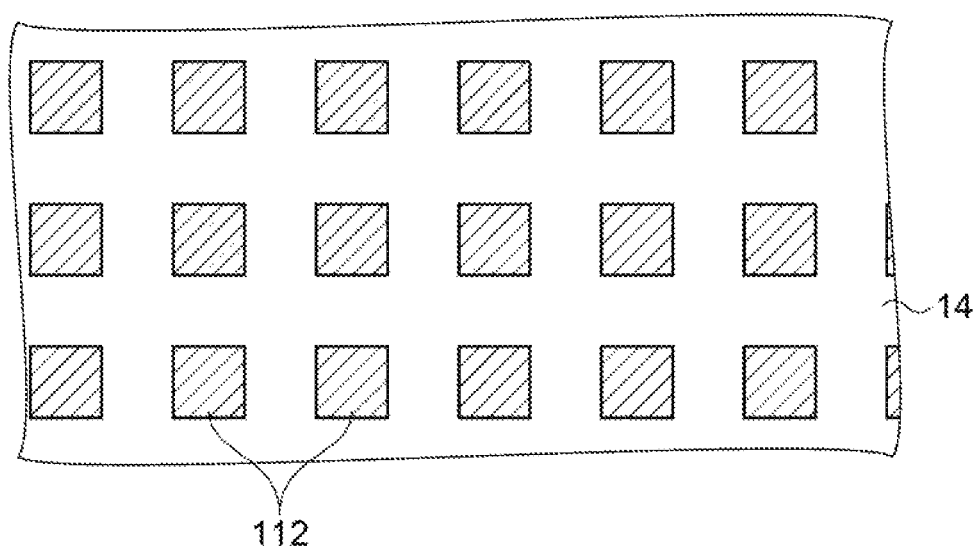
FIG. 32 is a diagram for describing the print preparation method of the printing apparatus.

FIG. 32 is a diagram corresponding to the patch mark print step of step S4. As illustrated in FIG. 32, in step S4, the print control unit 89 prints a patch mark 112 as a plurality of images on the printing medium 14. Many colors with different hue, lightness, and saturation are printed on each patch mark 112. One color is printed on one patch mark 112. The print control unit 89 stores the position of each patch mark 112 in the memory 78 as a portion of the measurement position data 88. The print control unit 89 also stores information on the color of each patch mark 112 in the memory 78 as a portion of the color adjustment related data 87.

Figure 33:
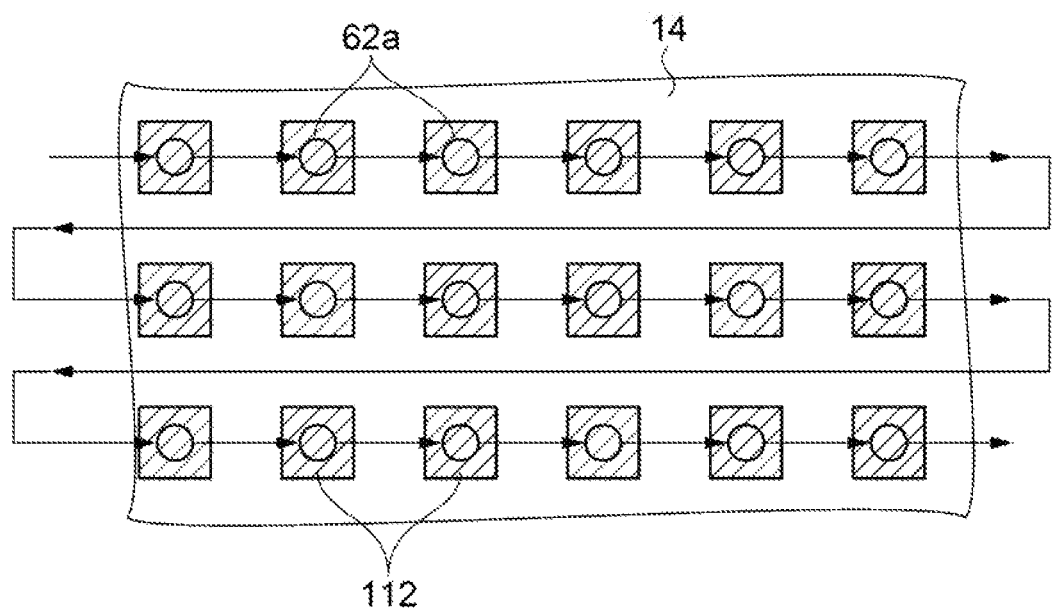
FIG. 33 is a diagram for describing the print preparation method of the printing apparatus.

FIG. 33 is a diagram corresponding to the color measurement step of step S5. As illustrated in FIG. 33, in step S5, the spectrometer control unit 94 outputs an instruction signal to the carriage control unit 90 and the transport roller control unit 91, and moves the printing medium 14 and the carriage 12 so that the optical axis 62a of the spectrometer 34 is located at the center of the patch mark 112. The spectrometer control unit 94 can move the optical axis 62a to the center of the patch mark 112 with reference to the data on the relative position coordinates and the data on each patch mark 112.

Next, the spectrometer 34 measures the spectrum of the patch mark 112. The measurement result is stored in the memory 78 as a portion of the spectral data 86. Next, when there is an unmeasured patch mark 112, the spectrometer control unit 94 moves the optical axis 62a to the center of the patch mark 112. The spectrometer control unit 94 sequentially performs the movement of the spectrometer 34 and the spectral measurement of the patch mark 112. The spectrum of all patch marks 112 printed in step S5 is measured.

In the color adjustment step of step S6, when the calibration unit 95 prints a predetermined color, the ratio for printing dots of a plurality of colors is adjusted. In the color adjustment related data 87, data of a table of ratios for printing dots of a plurality of colors and the spectra are stored for each color to be printed. In the color adjustment related data 87, an adjustment table used for adjusting the ratios for printing dots of a plurality of colors is stored. The calibration unit 95 performs the color adjustment using these tables. The color adjustment is realized by changing the table of ratios for printing dots of a plurality of colors. The changed table of ratios for printing dots of a plurality of colors is stored in the memory 78 as a portion of the color adjustment related data 87.

As described above, according to the present embodiment, the following effects are obtained.

(1) According to the present embodiment, the printing apparatus 1 includes the spectrometer 34, the carriage 12, and the second adjustment mechanism 48. The spectrometer 34 emits the light 54 to detect reflected light 54. The carriage 12 holds the spectrometer 34. The second adjustment mechanism 48 is a mechanism for adjusting the posture of the spectrometer 34 with respect to the carriage 12. In the spectrometer adjustment step of step S1, the spectrometer 34 emits the light 54 to the white board 75, and the white board 75 reflects the light 54. The spectrometer 34 detects the reflected light 54. The spectrometer 34 outputs a signal corresponding to the intensity of the light 54 to be detected. When the posture of the spectrometer 34 with respect to the carriage 12 is appropriate, the sensitivity of the spectrometer 34 is better than when the posture of the spectrometer 34 with respect to the carriage 12 is not appropriate. Accordingly, when the posture of the spectrometer 34 with respect to the carriage 12 is appropriate, the output of the spectrometer becomes larger than when the posture of the spectrometer 34 with respect to the carriage 12 is not appropriate.

The operator operates the second adjustment mechanism 48 with reference to the output of the spectrometer 34. The posture of the spectrometer 34 with respect to the carriage 12 can be adjusted to an appropriate posture by operating the second adjustment mechanism 48.

(2) According to the present embodiment, the second adjustment mechanism 48 includes three or more linear motion mechanisms 49. When each of the linear motion mechanism 49 moves by the same length, the distance of the spectrometer 34 with respect to the carriage 12 can be adjusted. When one of the three or more linear motion mechanisms 49 moves, the inclination of the spectrometer 34 with respect to the carriage 12 can be adjusted. That is, the spectrometer 34 can be rotated around one direction as an axis.

By changing the linear motion mechanism 49 to be moved, it is possible to change a direction in which the spectrometer 34 is inclined with respect to the carriage 12. That is, the spectrometer 34 can be rotated around another direction as an axis. Accordingly, the second adjustment mechanism 48 can adjust the position and inclination of the spectrometer 34 with respect to the carriage 12.

(3) According to the present embodiment, the head unit 32 is installed in the carriage 12. In the mark print step of step S2, the head unit 32 prints the measurement mark 105. In the mark position measurement step of step S3, the carriage moving portion 31 and the transport roller 29 move the spectrometer 34 to a position facing the measurement mark 105. The spectrometer 34 receives the light 54 reflected on the measurement mark 105 and outputs a signal of the intensity of the light 54 corresponding to the measurement mark 105. Accordingly, when the transport roller 29 moves the printing medium 14 and the carriage moving portion 31 moves the spectrometer 34, it is possible to detect whether or not the spectrometer 34 is located at a position facing the measurement mark 105. The movement amount measurement unit 19 measures the movement amount of the carriage. Accordingly, it is possible to detect the relative position of the position where the head unit 32 prints the image and the position where the spectrometer 34 detects the light 54.

(4) According to the present embodiment, the carriage control unit 90 of the control unit 6 controls the movement of the carriage 12. The control unit 6 has the memory 78, and the memory 78 stores the position of the measurement mark 105 printed by the head unit 32. The memory 78 stores the relative position of the position where the head unit 32 prints the measurement mark 105 and the position where the spectrometer 34 detects the light 54. Accordingly, in the color measurement step of step S5, the control unit 6 can move the spectrometer 34 to a position facing the patch mark 112.

(5) According to the present embodiment, the printing apparatus 1 includes the leg portion 2. The leg portion 2 supports the guide rail 10 and the guide rail 11 on which the carriage 12 moves. The white board 75 is installed on the leg portion 2. The white board 75 is installed at a position facing the range where the spectrometer 34 moves. At this time, it is possible to easily move the spectrometer 34 to a position facing the white board 75.

(6) According to the present embodiment, the printing apparatus 1 includes the lid portion 76a that covers the white board 75 so as to be openable and closable. When using the white board 75, it is possible to expose the white board 75 by opening the lid portion 76a. It is possible to move the spectrometer 34 to the position facing the white board 75. When the white board 75 is not used, the lid portion 76a is closed. At this time, since the white board 75 is covered with the lid portion 76a, contamination of the white board 75 can be suppressed even when the mist of the ink 36 is generated during the printing.

(7) According to the present embodiment, the second adjustment mechanism 48 includes the head portion 43a operating the second adjustment mechanism 48. It is possible to adjust the posture of the carriage 12 and the spectrometer 34 by operating the head portion 43a. The head portion 43a is provided on the side opposite to the side on which the head unit 32 discharges the ink 36. There is a mechanism for controlling the posture of the printing medium 14 to be printed on the side where the head unit 32 discharges the ink 36. Since there is a space on the side opposite to the side on which the head unit 32 discharges the ink 36, the head portion 43a can be easily operated.

The present embodiment is not limited to the above-described embodiments, and various modifications and improvements can be made by those having ordinary knowledge in the art within the technical idea of the invention. Modification examples will be described below.

MODIFICATION EXAMPLE 1

In the above embodiment, screws are used for the linear motion mechanism 49. In addition to the linear motion mechanism 49, the first distance 63 may be adjusted by a mechanism such as a plate cam, a rack and pinion.

MODIFICATION EXAMPLE 2

In the above embodiment, three spectrometer fixing screws 43 are provided in the spectrometer 34. Four or more spectrometer fixing screws 43 may be provided in the spectrometer 34. More detailed adjustment can be made.

MODIFICATION EXAMPLE 3

In the above embodiment, the spectrometer 34 is installed in the printing apparatus 1. The spectrometer 34 may be installed in electronic equipment such as a projector and a television in addition to the printing apparatus 1. At this time, the spectrum can be detected with good quality by installing the second adjustment mechanism 48.

The entire disclosure of Japanese Patent Application No. 2017-228722 filed on Nov. 29, 2017 is expressly incorporated by reference herein.

What is claimed is:

1. A printing apparatus comprising:
   a spectrometer that emits light to detect reflected light and outputs a signal corresponding to an intensity of the reflected light;
   a white board that reflects the emitted light;
   a carriage that holds the spectrometer;
   a body portion that supports a rail on which the carriage moves, and
   an adjustment mechanism that adjusts a posture of the spectrometer with respect to the carriage,
   wherein, in the body portion, the white board is installed at a position facing a range where the spectrometer moves.

2. The printing apparatus according to claim 1,
   wherein the adjustment mechanism includes three or more linear motion mechanisms, and each of the linear motion mechanisms adjusts the posture of the spectrometer and the carriage.

3. The printing apparatus according to claim 1, further comprising:
   a print head that is installed in the carriage and prints an image;
   a carriage moving portion that moves the carriage;
   a movement amount measurement unit that measures a movement amount of the carriage; and
   a printing medium moving portion that moves a printing medium in a direction intersecting a moving direction of the carriage,
   wherein the carriage moving portion and the printing medium moving portion move the spectrometer to a position facing the image.

4. The printing apparatus according to claim 3, further comprising:
   a control unit that controls a movement of the carriage,
   wherein the control unit has a storage unit, and
   wherein the storage unit stores a relative position of a position where the print head prints the image and a position where the spectrometer detects the reflected light, and a position of the image.

5. The printing apparatus according to claim 3,
   wherein the adjustment mechanism includes an operation unit that operates the adjustment mechanism on a side opposite to a side where the print head discharges ink.

6. The printing apparatus according to claim 3, wherein the body portion includes a platen that supports a media, and the adjustment mechanism includes an operation unit that operates the adjustment mechanism, the operation unit being on a surface of the spectrometer that is opposite of a surface of the spectrometer facing the platen.

7. The printing apparatus according to claim 1, further comprising:
   a cover that covers the white board so as to be openable and closable.

8. A printing apparatus comprising:
   a spectrometer that emits light to detect reflected light and outputs a signal corresponding to an intensity of the reflected light;
   a reference board that reflects the emitted light;
   a carriage that holds the spectrometer;
   a body portion that supports a rail on which the carriage moves; and
   an adjustment mechanism that adjusts a posture of the spectrometer with respect to the carriage,
   wherein, in the body portion, the reference board is installed at a position facing a range where the spectrometer moves.

* * * * *